(12) United States Patent
You et al.

(10) Patent No.: US 7,376,076 B2
(45) Date of Patent: May 20, 2008

(54) METHOD FOR TRANSFERRING AND/OR RECEIVING DATA IN COMMUNICATION SYSTEM AND APPARATUS THEREOF

(75) Inventors: Cheol Woo You, Seoul (KR); Young Woo Yun, Seoul (KR); Jong Hoe An, Kyonggi-do (KR); Suk Hyon Yoon, Seoul (KR); Young Jo Lee, Kyonggi-do (KR); Ki Jun Kim, Seoul (KR); Young Cho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1018 days.

(21) Appl. No.: 10/259,292

(22) Filed: Sep. 30, 2002

(65) Prior Publication Data

US 2003/0063595 A1 Apr. 3, 2003

(30) Foreign Application Priority Data

Sep. 29, 2001 (KR) .................... 10-2001-0060962
Sep. 29, 2001 (KR) .................... 10-2001-0060963
Sep. 29, 2001 (KR) .................... 10-2001-0060964
Oct. 13, 2001 (KR) .................... 10-2001-0063248
Oct. 13, 2001 (KR) .................... 10-2001-0063261
Oct. 17, 2001 (KR) .................... 10-2001-0064014
Nov. 3, 2001 (KR) .................... 10-2001-0068403

(51) Int. Cl.
*H04B 7/216* (2006.01)
*H04L 13/00* (2006.01)

(52) U.S. Cl. .................... 370/209; 370/329; 370/335

(58) Field of Classification Search ................ 370/329, 370/335, 342, 203, 209, 438, 441, 479
See application file for complete search history.

(56) References Cited

U.S. PATENT DOCUMENTS 6,317,413 B1 * 11/2001 Honkasalo .................. 370/209

(Continued)

FOREIGN PATENT DOCUMENTS

KR 10-2001-0086801 A 9/2001

OTHER PUBLICATIONS

Ericsson, "A new code multiplexing scheme for 1xEV-DV," Vancouver, British Columbia, Canada, Jun. 2001 WG5 Meeting, 3GPP2-C00-20010611-010-20010611-xxx (http://ftp.3gpp2.org/TSGC/Working/2001/TSG-C_0106/TSG-C_0601_Vancouver/WG5/C50-20010611-016_ERI_Code_Multiplexing.dot.

(Continued)

*Primary Examiner*—Min Jung
(74) *Attorney, Agent, or Firm*—Ked & Associates, LLP

(57) ABSTRACT

The present invention relates to Walsh Code Allocation (WCA) field in the Packet Data Control Channel. One of the embodiments of the WCA field is use of the WCA field as Last Walsh Code Index (LWCI) field in the message format of the PDCCH. The LWCI field indicates the corresponding last code index or the corresponding number of Walsh codes in a Walsh Code Index (WCI) Table/List/Set. In alternative embodiments, the WCA indicates a general set of Walsh codes or a specific set of Walsh codes in the WCI table. The WCA fields may or may not be used with one of power ranking and sequential decoding, but is preferable used. The WCA field has various advantages including but not limited to efficient use of system resources.

19 Claims, 15 Drawing Sheets

U.S. PATENT DOCUMENTS

| | | | |
|---|---|---|---|
| 6,473,395 B1* | 10/2002 | Lee | 370/209 |
| 6,504,832 B1* | 1/2003 | Koo et al. | 370/342 |
| 6,512,753 B1* | 1/2003 | Ahn et al. | 370/335 |
| 6,552,996 B2* | 4/2003 | Kim et al. | 370/209 |
| 6,693,954 B1* | 2/2004 | King et al. | 375/147 |
| 6,700,881 B1* | 3/2004 | Kong et al. | 370/335 |
| 6,961,304 B1* | 11/2005 | Rudrapatna et al. | 370/209 |
| 6,973,062 B1* | 12/2005 | Han | 370/335 |
| 6,975,615 B1* | 12/2005 | Toskala et al. | 370/342 |
| 7,006,464 B1* | 2/2006 | Gopalakrishnan et al. | 370/328 |
| 7,106,690 B2* | 9/2006 | Song | 370/208 |
| 2003/0103480 A1* | 6/2003 | You et al. | 370/335 |
| 2003/0108025 A1* | 6/2003 | Kim et al. | 370/342 |
| 2003/0128674 A1* | 7/2003 | Kong et al. | 370/320 |
| 2003/0193915 A1* | 10/2003 | Lee et al. | 370/335 |
| 2004/0146028 A1* | 7/2004 | Hsu et al. | 370/335 |

OTHER PUBLICATIONS

Nokia, "HSDPA related signaling parameters in downlink, version 2," TSG-RAN WG2 meeting No. 21, Busan, Korea, May 21-25, 2001 (Tdoc R2-011177) (XP-002291723).

LG Electronics Inc., "TD/CDM for 1XEV-DV Forward Link," Nov. 5, 2001 (XP-007900608) (ftp://frp.3gpp2.org/TSGC/Working/2001/TSG-C_0111/TSG-C-0111-Kauai/WG5/C50-2011105-011-LGE-CDMr1.pdf.

Ericsson, "Allocation of Walsh Codes and Quasi-Orthogonal Functions in cdma2000 Forward Link"; IEEE VTC2001; vol. 2, Oct. 7-11, 2001; pp. 747-751.

Shi, Qinghua, et al.; "Simple Spreading Code Allocation Scheme for Downlink MC-CDMA"; IEEE Electronic Letters; vol. 38, No. 15; Jul. 18, 2002; pp. 807-809.

PCT Search Report dated Jan. 15, 2003.

Korean Office Action dated Aug. 1, 2007.

* cited by examiner

FIG.1

| Field | Length (bits) |
|---|---|
| MAC_ID | 8 |
| WALSH_MASK | 0 or 13 |
| EP_SIZE | 0 or 3 |
| ACID | 0 or 2 |
| SPID | 0 or 2 |
| AI_SN | 0 or 1 |
| LWCI/CWSI | 0 or X_i |
| EXT_MSG_TYPE | 0 or 2 |
| RESERVED | 0 or 8 |

FIG. 4

| CODE Index (i) | Column Index (j) | | | |
|---|---|---|---|---|
| | (1) '000' | (2) '001' | (3) '010' | (4) '011' |
| 0 | 31 | 31 | 31 | 31 |
| 1 | 15 | 15 | 15 | 15 |
| 2 | 23 | 23 | 23 | 23 |
| 3 | 7 | 7 | 7 | 7 |
| 4 | 27 | 27 | 27 | 30 |
| 5 | 11 | 11 | 11 | 14 |
| 6 | 19 | 19 | 19 | 22 |
| 7 | 3 | 3 | 3 | 6 |
| 8 | 30 | 30 | 30 | 29 |
| 9 | 14 | 14 | 14 | 13 |
| 10 | 22 | 22 | 22 | 21 |
| 11 | 6 | 6 | 6 | 5 |
| 12 | 26 | 26 | 29 | 28 |
| 13 | 10 | 10 | 13 | 12 |
| 14 | 18 | 18 | 21 | 20 |
| 15 | 2 | 2 | 5 | 4 |
| 16 | 29 | 29 | 28 | 27 |
| 17 | 13 | 13 | 12 | 11 |
| 18 | 21 | 21 | 20 | 26 |
| 19 | 5 | 5 | 4 | 10 |
| 20 | 25 | 28 | 26 | 25 |
| 21 | 9 | 12 | 10 | 9 |
| 22 | 17 | 20 | 25 | 24 |
| 23 | 1 | 4 | 9 | 8 |
| 24 | 28 | 25 | 24 | 19 |
| 25 | 12 | 9 | 8 | 18 |
| 26 | 20 | 24 | 18 | 17 |
| 27 | 4 | 8 | 17 | 3 |

FIG.5

| Code Index | 32-ary Walsh |
|---|---|
| 0 | 31 |
| 1 | 15 |
| 2 | 23 |
| 3 | 7 |
| 4 | 27 |
| 5 | 11 |
| 6 | 19 |
| 7 | 3 |
| 8 | 30 |
| 9 | 14 |
| 10 | 22 |
| 11 | 6 |
| 12 | 26 |
| 13 | 10 |
| 14 | 18 |
| 15 | 2 |
| 16 | 29 |
| 17 | 13 |
| 18 | 21 |
| 19 | 5 |
| 20 | 25 |
| 21 | 9 |
| 22 | 17 |
| 23 | 1 |
| 24 | 28 |
| 25 | 12 |
| 26 | 20 |
| 27 | 4 | lwci0 = $(00011)_2 = 3$ → (points to Code Index 3)

lwci1 = $(01001)_2 = 9$ → (points to Code Index 9)

Can be used for other purposes (Code Index 10 through 27)

FIG.6A

| Code Index | 32-ary Walsh |
|---|---|
| 0 | 31 |
| 1 | 15 |
| 2 | 23 |
| 3 | 7 |
| 4 | 27 |
| 5 | 11 |
| 6 | 19 |
| 7 | 3 |
| 8 | 30 |
| 9 | 14 |
| 10 | 22 |
| 11 | 6 |
| 12 | 26 |
| 13 | 10 |
| 14 | 18 |
| 15 | 2 |
| 16 | 29 |
| 17 | 13 |
| 18 | 21 |
| 19 | 5 |
| 20 | 25 |
| 21 | 9 |
| 22 | 17 |
| 23 | 1 |
| 24 | 28 |
| 25 | 12 |
| 26 | 20 |
| 27 | 4 |

FIG.6B

| 32-ary walsh codes | code index | |
|---|---|---|
| | 0 | |
| 31 | 1 | |
| 15 | 2 | Walsh codes user for transferring PDCH(0) |
| 23 | 3 | |
| 7 | 4 | ← WCA(0)=(00100)$_2$= 4 |
| 27 | 5 | |
| 11 | 6 | |
| 19 | 7 | Walsh codes user for transferring PDCH(1) |
| 3 | 8 | |
| 29 | 9 | |
| 13 | 10 | ← WCA(1)=(01010)$_2$= 10 |
| 21 | 11 | |
| 5 | 12 | |
| 25 | 13 | |
| 9 | 14 | ← WCA(m-1)=(01110)$_2$= 14 |
| 30 | 15 | |
| 14 | 16 | |
| 22 | 17 | Walsh codes user for transferring PDCH(m) |
| 6 | 18 | |
| 26 | 19 | ← WCA(m)=(10011)$_2$=19 |
| 10 | 20 | |
| 18 | 21 | |
| 2 | 22 | |
| 28 | 23 | ← WCA(M-2)=(10111)$_2$=23 |
| 12 | 24 | |
| 20 | 25 | Walsh codes user for transferring PDCH(M-1) |
| 4 | 26 | ← WCA(M-1)=(11010)$_2$= 26 |
| 24 | 27 | |
| 8 | 28 | |

FIG.7A

| | 32-ary walsh codes walsh Index | Code Number | |
|---|---|---|---|
| Walsh codes allocation for 1st user Start code number=0 End code number= $ECN_0=3$ | 31 | 0 | |
| | 15 | 1 | |
| | 23 | 2 | |
| | 7 | 3 | ← WCA(0) = $00011_{(2)}$=3 |
| Walsh codes allocation for 2st user Start code number= $ECN_0+1=4$ End code number= $ECN_1=9$ | 27 | 4 | |
| | 11 | 5 | |
| | 19 | 6 | |
| | 3 | 7 | |
| | 29 | 8 | |
| | 13 | 9 | ← WCA(2) = $01001_{(2)}$=9 |
| | 21 | 10 | |
| | 5 | 11 | |
| | 25 | 12 | ← WCA(n-1) = $00011_{(2)}$=12 |
| Walsh codes allocation for n-th user Start code number= $ECN_{n-2}+1=13$ End code number= $ECN_{n-1}=16$ | 9 | 13 | |
| | 30 | 14 | |
| | 14 | 15 | |
| | 22 | 16 | |
| | 6 | 17 | |
| | 26 | 18 | |
| | 10 | 19 | |
| | 18 | 20 | |
| | 2 | 21 | |
| | 28 | 22 | |
| | 12 | 23 | |
| | 20 | 24 | |
| | 4 | 25 | |
| | 24 | 26 | |
| | 8 | 27 | |

FIG. 7B

| | 32-ary walsh codes | Code index | |
|---|---|---|---|
| Walsh codes user for transferring PDCH(0) | 31 | 0 | Statr walsh code (SWC) for PDCH(0) |
| | 15 | 1 | |
| | 23 | 2 | |
| | 7 | 3 | End walsh code (EWC) for PDCH(0) or Statr walsh code (SWC) for PDCH(1) |
| Walsh codes user for transferring PDCH(1) | 27 | 4 | |
| | 11 | 5 | |
| | 19 | 6 | |
| | 3 | 7 | |
| | 29 | 8 | |
| | 13 | 9 | End walsh code (SWC) for PDCH(1) or Statr walsh code (SWC) for PDCH(2) |
| | 21 | 10 | |
| | 5 | 11 | |
| | 25 | 12 | |
| | 9 | 13 | End walsh code (EWC) for PDCH(m-2) or Statr walsh code (SWC) for PDCH(m-1) |
| Walsh codes user for transferring PDCH(m) | 30 | 14 | |
| | 14 | 15 | |
| | 22 | 16 | |
| | 6 | 17 | |
| | 26 | 18 | End walsh code (EWC) for PDCH(m-1) or Statr walsh code (SWC) for PDCH(m) |
| | 10 | 19 | |
| | 18 | 20 | |
| | 2 | 21 | |
| | 28 | 22 | End walsh code (EWC) for PDCH(M-2) or Statr walsh code (SWC) for PDCH(M-1) |
| Walsh codes user for transferring PDCH(M-1) | 12 | 23 | |
| | 20 | 24 | |
| | 4 | 25 | |
| | 24 | 26 | End walsh code (EWC) for PDCH(M-1) |
| | 8 | 27 | |
| | | 28 | |

FIG.9

| | 32-ary walsh codes walsh Index | Code Number | |
|---|---|---|---|
| Walsh codes allocation for 1st user WCISV = 4 | 31 | 0 | |
| | 15 | 1 | |
| | 23 | 2 | |
| | 7 | 3 | ← WCA(0) = 00011$_{(2)}$=3 |
| Walsh codes allocation for 2nd user WCISV = 6 | 27 | 4 | |
| | 11 | 5 | |
| | 19 | 6 | |
| | 3 | 7 | |
| | 29 | 8 | |
| | 13 | 9 | ← WCA(2) = 01001$_{(2)}$=9 |
| | 21 | 10 | |
| | 5 | 11 | |
| | 25 | 12 | ← WCA(n−1) = 00011$_{(2)}$=12 |
| Walsh codes allocation for n-th user WCISV = 4 | 9 | 13 | |
| | 30 | 14 | |
| | 14 | 15 | |
| | 22 | 16 | |
| | 6 | 17 | |
| | 26 | 18 | |
| | 10 | 19 | |
| | 18 | 20 | |
| | 2 | 21 | |
| | 28 | 22 | |
| | 12 | 23 | |
| | 20 | 24 | |
| | 4 | 25 | |
| | 24 | 26 | |
| | 8 | 27 | |

| Information bits of PDDCH(i) | NO. of Information Bits |
|---|---|
| Encoder Packet Size (EP_SIZE) | 3 |
| ARQ Channel Identifier (ACID) | 2 |
| SubPacket Identifier (SPID) | 2 |
| ARQ identifier sequence number (AI_SN) | 1 |
| CWSI | x_i |
| CDMI | y_i |
| MAC Identifier (MAC_ID) | 8 |
| | Total Bits=(16+x_i+y_i)bits |

METHOD FOR TRANSFERRING AND/OR RECEIVING DATA IN COMMUNICATION SYSTEM AND APPARATUS THEREOF

This application claims priority to Korean Application Nos. 60962/2001 filed Sep. 29, 2001, 60963/2001 filed Sep. 29, 2001, 60964/2001 filed Sep. 29, 2001, 68403/2001 filed Nov. 3, 2001, 63261/2001 filed Oct. 13, 2001, 63248/2001 filed Oct. 13, 2001, and 64014/2001 filed Oct. 17, 2001, whose entire disclosures therein are incorporated herein by reference,

BACKGROUND OF THE INVENTION

1. Field of the Invention

The present invention relates to a communication system, and more particularly, to a method for transferring a packet data in a mobile communication system.

2. Background of the Related Art

Typically, radio communication systems for transferring packet data use physical channels, such as, Packet Data Channel (hereinafter referred to as PDCH), Packet Data Control Channel (hereinafter referred to as PDCCH) and so forth.

The PDCH is a channel for use of transferring packet data that actually needs to be transferred to a relevant terminal, mobile station or user (hereinafter being used interchangeably). Many users prefer the PDCH based on the Time Division Multiplexing system (hereinafter referred to as TDM system). The PDCCH contains control information, enabling a terminal to receive the data being transferred through the PDCH without error.

When a base station transfers packet data using TDM system, or schedules data and later sending the data to each terminal in sequence, the packet data, which is transmitted to every terminal, always uses all of the available resources, e.g., Walsh codes, in the PDCH. Even when only a part of the available resources needs to be used, all of the resources are still used for the packet data. As a result thereof, most of other resources are wasted at the same time.

For example, data sent on PDCH need to be coded and decoded based on Walsh codes. Serial bits are converted to parallel, and the parallel bits are coded using the Walsh codes. In order to decode the data, the information regarding the Walsh codes is sent on the PDCCH.

In TDM system, there are plurality of time intervals 1, 2, 3, 4, 5, 6, etc, and only one of a plurality of terminals is allotted for each time interval where a PDCH and PDCCH are sent to the terminal during this allotted time interval. For example, if there are users 1 and 3 and time intervals 1 and 3, respectively, and if all 32-ary Walsh codes are available for use by terminal 1, all 32-ary Walsh codes are utilized in the PDCH during time interval 1. However, if the available Walsh codes decrease in time interval 3, all decreased Walsh codes are utilized for the PDCH. Even before terminal 3 can use the changed/decreased Walsh codes in time interval 3, it needs to know this information. In order to achieve this, the BS broadcasts such information using a Walsh Code Space Identification Identifier (WSI) field in the PDCCH (without PDCH) with MAC_ID field information bit of $(000000)_2$ before time interval 3 to all terminals within a cell.

A base station regularly or irregularly broadcasts WSI on the PDCCH without the PDCH to all terminals under its management. In the course of the broadcast, the base station uses every possible power for all terminals (even including terminals in the worst environment) to be able to receive the information such that even the terminals in the worst environment can receive the WSI. Hence, the broadcasting consumes much power. Moreover, when the WSI change, the base station has to inform the changes to all terminals every time. In those cases, the base station cannot transmit PDCH, so the transmission efficiency of the entire system is consequently reduced.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a method for transferring packet data to increase the resource usage efficiency.

Still another object of the invention is to provide a method for transferring packet data for use of a system based on Code Division Multiplexing mode (CDM)/Time Division Multiplexing (TDM) mode.

The present invention can be achieved in a whole or parts by a method comprising allowing a plurality of users to receive data; and decoding the data based on a table of code indices indicative of the channels, wherein a code index from the table indicate a prescribed channel for decoding the data.

The present invention can be achieved in a whole or parts by a method of providing information regarding the channels, comprising sending a code index i from a plurality of code indices 0-N, wherein code index i indicates 0 to i channels The present invention can be achieved in a whole or parts by a method of decoding data received through Pack Data Channel (PDCH) using a Last Walsh Code Index (LWCI) of a Packet Data Control Channel Message transmitted over the Packet Data Control Channel (PDCCH) with the PDCH, comprising: decoding the LWCI; and decoding the data using N number of Walsh codes based on the LWCI.

The present invention can be achieved in a whole or parts by a message format of a Forward Packet Data Control Channel Message transmitted on at least one of F-PDCCH0 physical channel and F-PDCCH1 and having MAC_ID, WALSH_MASK, EP_SIZE, ACID, SPID, AL_SN, EX_M-SQ_TYPE AND RESERVED, wherein the improvement comprises at least one of a first Last Walsh Code Index lwci0 of the F-PDCCH0 physical channel and a second Last Walsh Code Index lwci1, and the lwci0 indicates that Walsh code set includes $0^{th}$ through $lwci0^{th}$ entries in a Walsh Code Index (WCI) table. Preferably, the WCI table may be pre-stored in a mobile station and a base station, and respectively, the useable WCI table may be predetermined by signaling channel with each other.

The present invention can be achieved in a whole or in parts by a method of providing information regarding the channels, comprising sending a code index i from a plurality of code indices 0-N, wherein code index i indicates 0 to i channels.

The present invention can be achieved in a whole or in parts by a method comprising:

allowing a plurality of users to receive data; decoding the data based on a table of code indices indicative of the channels, wherein a code index from the table indicate a prescribed channel for decoding the data.

The present invention can be achieved in a whole or in parts by a method for decoding data in a communication network, comprising: determining a prescribed value from a prescribed number of bits of a received field, wherein the prescribed value corresponds to at least one value in a table of first values; and determining a set of second values based on the prescribed value to decode the data, wherein there is a prescribed relationship between the first values and the second values."

The present invention can be achieved in a whole or parts by a method of allocating codes for corresponding data channels from a prescribed number of codes comprising: assigning code indices to the prescribed number of codes, such that there is a one-to-one correspondence between each code index and each code; transmitting a control message over the control channel, the control message having a plurality of fields, wherein one of the fields contains prescribed number of information bits based on at least one code index; and transmitting the data over the PDCH, wherein control message and data are sent concurrently.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 illustrates a format of the Packet Data Control Channel (PDCCH) Message in accordance with a preferred embodiment of the present invention;

FIG. 4 illustrates WCI Table/List/Set in accordance with a preferred embodiment of the present invention;

FIG. 5 illustrates WCI Table where Walsh Code Allocation (WCA) field is used as Last Walsh Code Index (LWCI) field in accordance with a preferred embodiment of the present invention;

FIG. 6A illustrates masking of the Walsh codes in accordance with a preferred embodiment of the present invention;

FIG. 6B illustrates another embodiment of the WCA field in accordance with a preferred embodiment of the present invention;

FIG. 7A illustrates another embodiment of the WCA field in accordance with a preferred embodiment of the present invention;

FIG. 7B illustrates another embodiment of the WCA field in accordance with a preferred embodiment of the present invention;

FIG. 9 illustrates another embodiment of the WCA field in accordance with a preferred embodiment of the present invention;

DETAILED DESCRIPTION OF PREFERRED EMBODIMENTS

FIG. 1 illustrates the format of the Packet Data Control Channel (PDCCH) Message in accordance with the preferred embodiment (described hereinafter), over the PDCCH, e.g., forward PDCCH (F-PDCCH). The CWSI/LWSI field of the message format preferably prevents wasted power consumption caused by broadcasting, and eliminates such broadcast. Even if broadcasting is used, the additional field of CWSI/LWSI reduces the inefficiencies of a prescribed system. This message format can be used in both a TDM system, i.e., one PDCH physical channel and one PDCCH physical channel within a prescribed time interval and uses the available Walsh codes, and a Code Division Multiplex (CDM) system, i.e., a plurality of PDCH (i) physical channels and a plurality of PDCCH(i) physical channels, where i is an integer number that is greater than or equal to 0, within a prescribed period of time and the plurality of users are assigned to a plurality of physical channels by allocation of the Walsh codes within the Walsh code space.

It is noted that the Walsh code, PDCH, and PDCCH are not necessarily limited to their definitions. Rather, they generally represent codes and channels having such prescribed functions. Further, $N_{max\_PDCH}$ is the maximum number of PDCHs or PDCCHs available for a relevant system or sector, where $N_{max\_PDCH} > 0$. $N_{real\_PDCH}$ is the number of PDCHs or PDCCHs that are currently being used for a relevant system or sector at a certain point, where $0 < N_{real\_PDCH} \leq N_{max\_PDCH}$.

Figure 2:
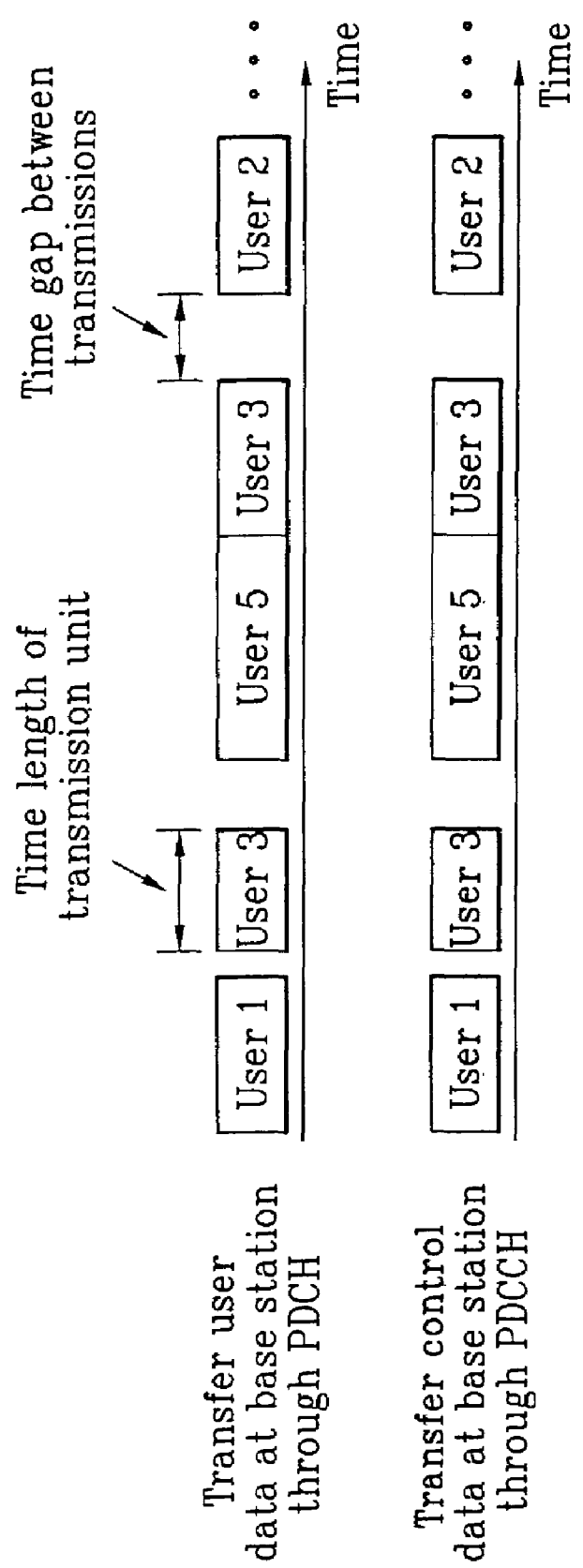
FIG. 2 is a diagram illustrating packet data transmission using Time Division Multiplexing (TDM) system in accordance with a preferred embodiment of the present invention.

For example, in a TDM based packet data transfer method illustrated in FIG. 2, i.e., $N_{max\_PDCH}=1$ and $N_{real\_PDCH}=1$, base station schedules the data to transfer, and sends the data to each terminal in order. In doing so, the base station uses the currently available Walsh codes for PDCH.

In FIG. 2, a time length of a transmission unit on PDCH and PDCCH could be fixed or varied. Further, the time length of PDCH and PDCCH does not have to be the same. The user k means packet data or control information for a user k. The transmission time and length of PDCH and PDCCH for the user k are determined in conforming to a prescribed rule. Further, the time gap between PDCH transmission and PDCCH transmission for each user may exists or may not exist at all, depending on the system environment. The same applies to a dual mode system.

In a dual mode system, such as a CDM/TDM system, involves a base station scheduling the data to be transferred to each user and sending the data following the TDM and CDM method. Although this system is referred to as a dual mode system, it can be appreciated by one of ordinary skill in the art that a CDM system can be viewed as a single mode system, since a CDM system inherently includes a TDM mode, i.e., where only one user within a prescribed the length.

For example, a single PDCH with a corresponding PDCCH could be transferred at a prescribed length of the transmission unit (interval d), or several PDCH(i) with corresponding PDCCH(i) could be transferred together (interval a, b, c and e, etc). The PDCCH(i) is an individual PDCCH physical channel having its own control information. In a TDM mode, i.e., a single PDCH is transferred of interval d, the Walsh codes need not be divided. But if a plurality of PDCH(i) are transferred, the Walsh codes are divided or allocated between the physical channels.

Figure 3:
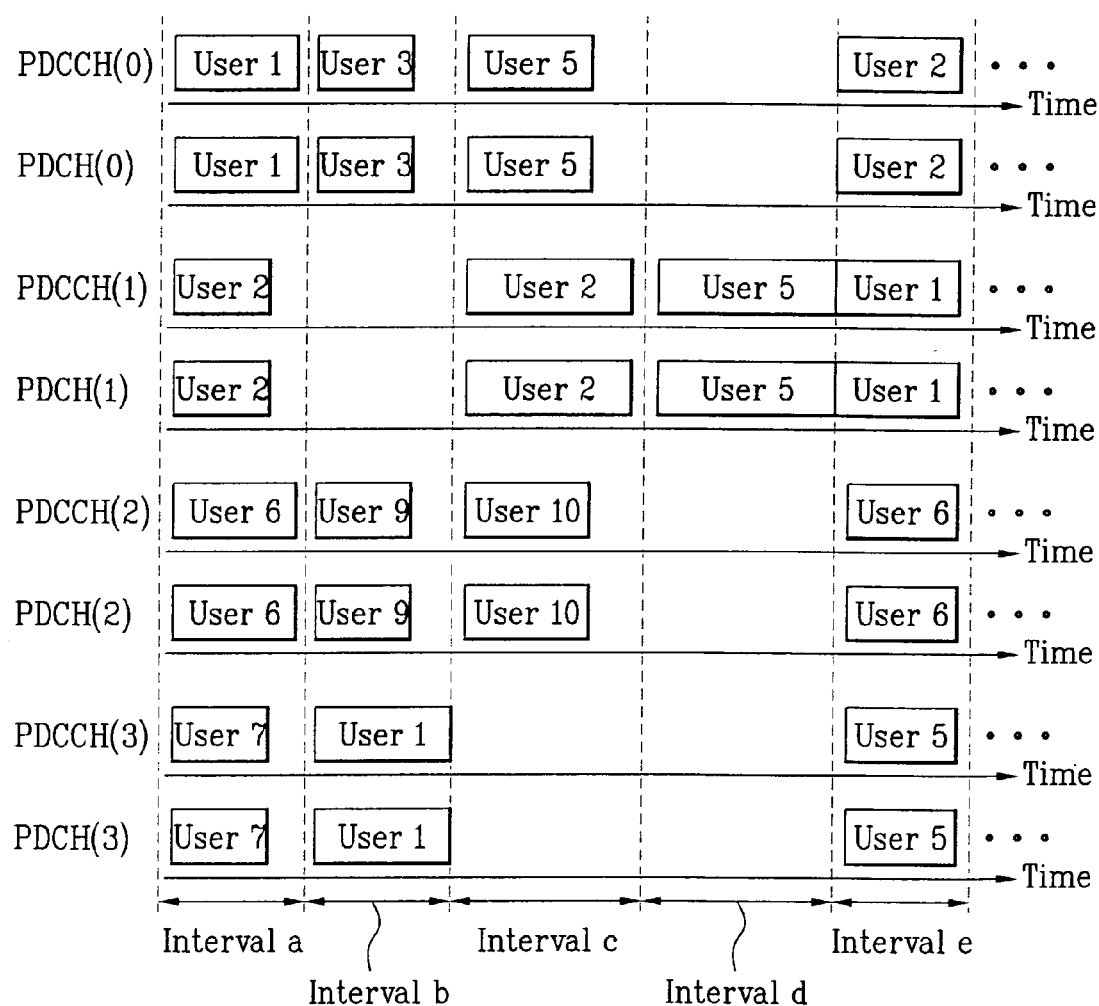
FIG. 3 is a diagram illustrating packet data transmission using CDM/TDM system in accordance with a preferred embodiment of the present invention.

FIG. 3 illustrates a case in which a maximum 4 PDCHs could exist in the CDM/TDM system. The empty space shown in FIG. 3 indicates when PDCH or PDCCH is not occupied or used. For example, during the interval a, four PDCH(i) are transferred with four corresponding PDCCH (i). Thereafter, during interval b, three PDCH(i) are transferred with three corresponding PDCCH(i). During interval c, three PDCH(i) are transferred with three corresponding PDCCH(i) and during interval d, one PDCH(i) is transferred with a corresponding PDCCH(i). During interval e, four PDCH(i) are transferred with four corresponding PDCCH (i).

As discussed above, the message format of PDCCH includes a plurality of fields, e.g., 9 fields, and a prescribed number of bits are used for each fields to form the control information bits. Based on the binary value of the bits, each field provides a prescribed control function for the operation of the user to use the data/information received on the PDCH. The description of the fields illustrated in FIG. 1 is as follows:

(1.) MAC_ID: The MAC identifier filed is a prescribed number of binary bit that is used for identifying a user. Preferably, the prescribed number of binary bits is 8 for the MAC_ID field. Except for '00000000' to '00111111', the MAC_ID field indicates which terminal the PDCCH information is being transferred. The base station preferably sets this field to the MAC identifier assigned to the user that is to decode a PDCH subpacket transmission, e.g., forward PDCH (F-PDCH), concurrent with the transmission of this message on the PDCH. If the MAC_ID is set to '00000000', the base station preferably includes the WALSH_MASK field of a prescribed number of bits, e.g., 0 or 13, and omits the remaining fields. Otherwise, the base station preferably omits the WALSH_MASK field and includes the remaining fields.

(2.) WALSH_MASK: The Walsh Space Mask Bitmap field is preferably set by the base station to indicate that the mobile station, is to omit certain entries in the packet data channel Walsh set when decoding the PDCH, e.g., F-PDCH. The base station preferably sets each bit in this filed to '0' or '1' to indicate that the mobile station is to include ('0') or omit ('1') the corresponding indices in the Walsh index table (WCI-to be described hereinafter).

(3.) EP_SIZE: The Encoder packet size field comprises a prescribed number of bits, e.g., 0 or 3 bits, that indicates the number of data information bits being transferred on the PDCH. For example, if this message field contains an extended message, the base station preferably sets this field to the encoded value for the encoder packet size (other than '111') for the PDCH subpacket transmission concurrent with transmission of this message on the PDCH. If EP_SIZE is not set to '111', the base station preferably includes ACID, SPID, AI_SN and LWCI/CSWI (to be described hereinafter). If the EP_SIZE is set to '111', the base station preferably includes the fields, EXT_MSG_TYPE and RESERVED, and otherwise, the base station omits these two fields.

(4.) ACID, SPID and AI_SN: The ARQ Channel Identifier field (ACID), the Subpacket Identifier field (SPDI) and ARQ Identifier Sequence Number field (AI_SN), each comprising a prescribed number of bits (preferably, 0 or 3, 0 or 2, 0 or 2, and 0 or 1, respectively), and each is preferably set by the base station for the PDCH subpacket transmission concurrent with the transmission of this message on the PDCH. The ACID and SPID are used to inform a terminal whether the information on the PDCH, which corresponds to PDCCH, is retransmitted or not. For instance, the ACID informs a mobile station (assuming that it can transfer a number of retransmitted channels) which channel is being retransmitted among other retransmitted channels, and which subpacket in the retransmitted channel (especially for the encoded symbols from an information stream that is being repeated and split to designated subpackets) is being transferred.

(5.) EXT_MSG_TYPE: The Extended Message Type Identifier field has a prescribed bit length (preferably, 0 or 2) and is preferably set by the base station to be '00' or '01'. The base station may set this field to '00' to indicate that the mobile station to exit a prescribed mode, e.g., PDCH Control Hold Mode. The base station may set this field to '01' to indicate that the mobile station is to terminate the current switching transmission pattern prior to the maximum number of switching frames.

(6.) RESERVED: The Reserved Bits field has a prescribed bit length (preferably 0 or 8 bits) and is preferably set by the base station to be '00000000'.

(7.) LWCI/CWSI: The Last Walsh Code Index (LWCI) field, which can be also called a CDM Walsh Space Identification (CWSI) field, is based on Walsh codes within a Walsh code space and/or a code index. The label "x_i" indicates that the number of bits x may vary depending upon the corresponding PDCCH(i) physical channel and the code indices may or may not be based on priority. However, for the embodiment using the LWCI field, "x_i" equals 0 or 5 bits for all PDCCH(i) physical channels and 5 bits is sufficient for each PDCCH for allocating all the possible Walsh code allocation patterns in the preferred embodiment.

As can be appreciated, the number of bits for this field can differ depending on the number of all possible code allocation pattern and the type of codes, e.g., Walsh codes, being used. Further, the field for LWCI/CSWI serve the substantially the same function/way/result of allocating Walsh codes for use by a corresponding PDCCH(i), and this field can be generally called a Walsh Code Allocation (WCA) field. Depending upon the embodiments, the WCA field can be used to indicate the number of codes used or a general/ specific set of Walsh code belonging to the WCI table based on the code indices.

In the preferred embodiment, the Walsh code is a common name of codes having orthogonality to each other and is generally used for transmission over the physical channel. As can be appreciated, different types of codes can be used depending on the system. The Walsh code space is a set of currently available Walsh codes when a base station transfers packet data, and the Walsh code space can vary depending upon time. Walsh_Max indicates a maximum number of Walsh codes that the Walsh code space can accommodate and Walsh (all) is a parameter indicating all Walsh codes that are usable for PDCH on the Walsh code space. Based on the Walsh codes within the Walsh code space, a code index from 0 to a prescribed number (num), where num>0 are assigned with a corresponding Walsh code within the Walsh code space. The assignment of the code indices to the Walsh codes in the Walsh code space can also be based upon priority.

FIG. 4 illustrates a 32-ary Walsh Code Indices (WCI) Table (or Set or List) where Walsh_Max=28 within the Walsh code space with a code index (e.g., num=0 to 27) assigned to each Walsh code within the Walsh code space. FIG. 4, illustrates a 32-ary Walsh Code, but as can be appreciated by one of ordinary skill in the art, this can be different, e.g., 64-ary Walsh Code, based on the system requirements. Further, Walsh_Max is illustrated herein as exemplary, and not limited to a value of 28. Preferably, the WCI table may be pre-stored in a mobile station and base station, and the usable WCI table may be predetermined by signal channeling between each other.

In composing the WCI table, the code index is based on priorities of every Walsh code in the Walsh code space. For example, if there are a total of 28 Walsh codes (Wal_Max=28) available for composing the Walsh code space, every Walsh code corresponds to a code index. However, since the WCI table of the preferred embodiment lists the Walsh codes from the highest priority to the lowest, a lower code index corresponds to a higher priority. However, when the Walsh codes in the Walsh code space need to be allocated to the PDCH/PDCCH, the allocation may be based on priority (priority allocation) where the lowest code indexed Walsh codes are used before the higher code indexed Walsh codes, or priorities do not matter (non-priority allocation), e.g., a Walsh code with the lowest priority may be used first before a Walsh code with the highest priority code index.

In one of the preferred embodiments using the WCA field, especially for the embodiment using the LWCI field, power ranking is preferably used to determine which terminal is assigned to which PDCCH physical channel. Unless specifically indicated in the foregoing embodiments, power ranking may or may not be used. In other words, the modulation symbols transmitted on PDCCH (i) should be transmitted using at least as much energy as the modulation symbols transmitted on PDCCH(i+1) which is transmitted simultaneously with PDCCH(i). The power ranking generally assures that all terminals properly receive the information sent on the Packet Data Control Channel (PDCCH). In the preferred embodiment, power ranking is based on the required transmission power of the PDCCH of each scheduled user, i.e., when N PDCCH(i)/PDCH(i) are used at some time interval, user requiring the most power is assigned PDCCH(0) and user requiring the least power is assigned PDCCH(N-1). Alternatively, a user with the worst environment is assigned to PDCCH(0) and a user with the best environment is assigned to PDCCH(N-1).

For example, the terminal furthest away from base station, i.e., the terminal using the largest amount of power, is assigned to PDCH(0) and PDCCH(0), the terminal second furthest away from the base station is assigned PDCH(1) and PDCCH(1), the terminal third furthest away from the base station is assigned PDCH(2) and PDCCH(2), etc, such that power ranking of the PDCCH(i) physical channels is as follows PDCCH(0)≧PDCCH(1)≧ ... PDCCH(i)≧ ... ≧PDCCH(N-2)≧PDCCH (N-1), assuming that there are N number of terminals within a prescribed time interval.

For example if terminal 1 requires 3 mW and terminal 3 requires 7 mW, e.g., terminal 3 is further away from the base station than terminal 1 or terminal 3 is located in an environment which is worse than the environment of terminal 1, then PDCH(0) and PDCCH(0) is assigned or allocated to terminal 3 and PDCH(1) and PDCCH(1) is assigned or allocated to terminal 1.

Although in this example, power ranking was based on distance, this illustration is intending to be illustrative of power ranking, and the present invention is not to be limited based on this example since distance of the terminals is one of the ways for using the power ranking and other factors can be used for power ranking with or without distance consideration.

In 3GPP2 C.S0003-C v1.0, the 3GPP2 group has decided to use two physical data channels, PDCH(0) and PDCH(1), with two corresponding physical control channels, PDCCH (0) and PDCCH(1) and power ranking is used to assign terminals to the physical channels. In other words, the modulation symbols transmitted on the PDCCH(0) should be transmitted using at least as much energy as the modulation symbols transmitted on the PDCCH(1) that is being transmitted simultaneously.

General Setup in Accordance with a Preferred Embodiment.

A base station uses an appropriate channel to inform $N_{max\_PDCH}$ to terminals under its management. $N_{max\_PDCH}$ could be a maximum PDCCH(i) a relevant system or a sector can simultaneously use or the number of PDCH(i), and $N_{max\_PDCH}$ could be either fixed or variable. The base station decides $N_{real\_PDCH}(\leq N_{max\_PDCH})$ according to the scheduling result. If $N_{real\_PDCH}$ is 1, it involves the TDM system, and if $N_{real\_PDCH}$ is greater than 1, it involves the CDM system. Thereafter, the base station can use as many as PDCH/PDCCH based on the $N_{max\_PDCH}$, e.g., PDCH(0)/PDCCH(0), PDCH(1)/PDCCH(1), ... , and PDCH($N_{max\_PDCH}$-1)/PDCCH($N_{max\_PDCH}$-1) as control channels.

A terminal preferably needs to find out which Walsh code is being used to transmit PDCCH, and the terminal may obtain a Walsh Code list (WCL) from the base station, in which the WCL includes the Walsh codes PDCCH uses, and the base station provides the WCL. The code indices wcl(0), wcl(1), ... , and wcl($N_{max\_PDCH}$-1) preferably have a one-to-one relationship with the PDCCH(0), PDCCH (1), ... , and PDCCH($N_{max\_PDCH}$-1), i.e., PDCCH(i) is transmitted by using wcl(i), based upon a predetermined rules between the base station and the terminals under its management.

Walsh Code list (WCL) is used to differentiate the different PDCCH(i) channels, whereas, WCA(i) is a field included in each PDCCH(i) to indicate a number of corresponding Walsh codes or a general/specific set of Walsh codes which is used to decode the data received via PDCH(i). Similar to WCI, the WCL is preferably stored in a mobile station and a base station, and the usable WCL may be obtained by channel signaling between each other.

General Decoding in Accordance with the Preferred Embodiment

When a terminal interprets each WCA(i) received through control channels, the interpretation of these field can be done independently in the preferred embodiment(s). For example, if the WCA field is indicative of a specific set (rather than a general set or a number of corresponding Walsh codes) of Walsh codes based on the code indices, the intended user matches the MAC_ID and obtains the WCA(i) without reference to other WCA(j)(i≠j).

In alternative preferred embodiment(s), the WCA(i) field may be indicative of the code index to form a set of Walsh codes or the WCA(i) field is indicative of a general set number of Walsh codes based on the code indices in the WCI table, the interpretation is preferably dependent upon other WCAs, where in order to interpret WCA(i), the terminal preferably refers to another WCA(j)(i≠j) based upon a predetermined condition for more accurate interpretation of its own WCA(i) value.

As discussed above, WCL is preferably used to differentiate each PDCCH(i) from one another. In this instance, the base station transmits PDCH(i) to a corresponding terminal in accordance with the PDCCH(i) information contain the MAC_ID of the corresponding terminal, and the terminal matches its MAC_ID and the MAC_ID of PDCCH(i). For example, the terminal sequentially decodes PDCCH(0), PDCCH(1), ..., PDCCH($N_{max\_PDCH}$-1) using wcl(0), wcl(1), ..., wcl($N_{max\_PDCH}$-1) until it finds its own MAC identifiers. Alternatively, the terminal can decode channels in a reverse order of PDCCH($N_{max\_PDCH}$-1), PDCCH($N_{max\_PDCH}$-2), ..., PDCCH(0) using wcl($N_{max\_PDCH}$-1), wcl($N_{max\_PDCH}$-2), ..., wcl(0) until it finds its own MAC_ID.

The predetermined condition for the WCA(i) may be based on WCA(i-1) being found. In this case, a terminal or a user who is assigned to receive the WCA(i) of PDCCH(i) should be able to receive the corresponding WCA values that are being transferred on PDCCH(0), PDCCH(1), ..., PDCCH(i-1) or at least a terminal assigned to receive the WCA(i) of PDCCH(i) should be able to receive the WCA(i-1) that is being transferred on PDCCH(i-1). Unless explicitly indicated, this sequential decoding may or may not be used in the forgoing embodiments.

First Preferred Embodiment of WCA Field

The following will be a discussion related to the use of the WCI Table using the Walsh codes indices corresponding to the column index "000" in FIG. 4 as WCA field. Further, this explanation will be focus on two physical channels, (1) PDCH(0) and PDCCH(0) and (2) PDCH(1) and PDCCH(1), which is exemplary of the disclosure in 3GPP2 C.S0003-C v1.0, but is not intended to limit the scope of the claimed invention and the disclosure herein.

As discussed above, the LWCI field is based upon the use of the code indices based on priority allocation, e.g., the PDCCH(0) physical channel is allocated a first set of Walsh codes corresponding to the lower code indices and the PDCCH(1) physical channel is thereafter allocated to second set of Walsh codes corresponding to the higher code indices after the first set of lower code indices have been assigned. In other words, the available Walsh codes in the Walsh code space is divided into a plurality of sets of Walsh codes, where the lower code indices are allocated or assigned to a lower numbered PDCCH. As can be appreciated, this priority can be reversed, where higher code indices are first allocated to a lower number PDCCH in an alternative embodiment (non-priority allocation).

Power ranking is also preferably used with the LWCI field, i.e., the terminal requiring the most power is assigned to PDCCH(0), and the terminal requiring the least power is assigned PDCCH(1). As can be appreciated, power ranking is preferable especially when there are more than two terminals. As can be further appreciated, power ranking may or may not be needed when two physical channels for two corresponding terminals are used, but is preferable.

For example, FIG. 5 illustrates the WCI Table, where there are 28 Walsh codes (Walsh_Max=28) in the Walsh code space, and each Walsh code is assigned to a corresponding code index. As discussed above, the available Walsh codes can change even though there are 28 Walsh codes in the Wash codes space. For example, based on power ranking, terminal 1 is assigned to PDCCH(0) and terminal 3 is assigned to PDCCH(1). If the LWCI field (lwci0) of PDCCH(0) equals 3 $(00011)_2$ and the LWCI field (lwci1) of PDCCH(1) equals 9 $(01001)_2$, the Walsh codes are divided into two sets, where Walsh codes corresponding to indices 0-3 would be allocated to PDCCH(0) and Walsh codes corresponding to indices 4-9 would be allocated to PDCCH(1). Hence, the PDCH(0) for terminal 1 is transmitted on Walsh codes 31, 15, 23, and 7 while the PDCH(1) for terminal 3 is transmitted on Walsh codes 27, 11, 19, 3, 30 and 14.

In other words, the terminal assigned to PDCCH(0) transmission of the PDCH(0) occurs on Walsh codes with index 0 to index i in the WCI table, where i=the binary bits indicated in the LWCI field (lwci0) of the PDCCH(0). The terminal assigned to PDCCH(1) transmission of the PDCH(1) occurs on Walsh codes with index (i+1) to the j-th Walsh code, where j=the binary bits indicated in the LWCI field (lwci1) of the PDCCH(1).

As shown in FIG. 5, the present invention does not use all the Walsh codes in the WCI Table, and Walsh codes from code index 10 to code index 27 can be used for other purposes. Further, the WCI Table is divided into two sets and allocated for PDCCH(0) and PDCCH(1) transmission of PDCH(0) and PDCCH(1), respectively. Moreover, this allocation of the WCI Table can be readily applicable to situations where more than two physical channel assignments are required. With such CDM scheduling, the base station is no longer required to broadcast within an entire cell the available codes.

Similar to CDM scheduling, the LWCI field (lwci0) of PDCCH(0) is used to indicate the available Walsh code space in TDM scheduling. Only PDCCH(0) is used and PDCCH(1) is suspended. Further, if there are more than two physical channels, PDCCH(1) to PDCCH($N_{max\_PDCH}$-1) are suspended. Likewise, not all available Walsh codes need to be used, and broadcasting is not required in this preferred embodiment.

In terms of the mobile station or terminal, a sequential decoding of the PDCCH is performed by all mobile station. Starting from PDCCH(0), the mobile station keeps on decoding the PDCCH until its corresponding MAC_ID is found. Once detecting the corresponding MAC_ID on the PDCCH(i), the mobile station assigned to PDCCH(i) collects the LWCI fields (lwci(i-1)) of PDCCH(i-1) and the LWCI field (lwci(i)) of PDCCH(i).

For example, when PDCCH(0) has been assigned to terminal 1 for transmission of PDCH(0), terminal 1 decodes the PDCCH(0) to determine lwci0. Since the code indices are based on priority allocation, terminal 1 can determine that PDCH(0) has been transmitted based on Walsh codes from index 0 to index lwci0 of the WCI table. However, for terminal 3 assigned to PDCCH(1) for transmission of PDCH(1), terminal 3 needs to collect the lwci0 in order to determine the Walsh codes from index lwci0+1 to index lwci1. Although terminal 3 can readily collect the lwci1 based on the MAC_ID of the PDCCH(1), terminal 3 still needs to obtain lwci0 from PDCCH(0). Due to power ranking, terminal 3 can ascertain that PDCCH(0) is transmitted with a higher power than itself or at least a equal power. Based on power, terminal 3 can obtain the lwci0 from PDCCH(0) to decode the PDCH(1) using the Walsh codes corresponding to index lwci0+1 to index lwci1.

In certain instances, the Walsh codes in the WCI table may be masked, and the terminal needs to receive the information regarding the masked Walsh codes to properly determine lwci(i), e.g., lwci0 and lwci1. FIG. 6A illustrates the masking of Walsh codes corresponding to indices 1-3 (lightly shaded with italic text and underling). It is noted that Walsh codes from indices 13-27 (darkly shaded with bold text and underling) are used for other purposes.

In such a situation, the base station notifies all the terminals by sending on PDCCH(0) with a MAC_ID field of '00000000' and the WALSH_MASK field indicating which corresponding indices in the WCI table need to be omitted or deleted during a first prescribed time interval. Further, lwci0 is equal to −1 (negative 1). Thereafter, during the PDCCH(1) transmission of PDCH(1) within the first prescribed time interval, the corresponding terminal deletes the Walsh codes corresponding to the indices indicated to be omitted from PDCCH(0). Based upon such deletion, the decoding of PDCH(1) is based upon the WCI table illustrated in FIG. 6A. For example, if lwci1 on PDCCH(1) is equal to 12 and since −1 (lwci0)+1 equals 0, the PDCH(1) is decoded using Walsh codes 31, 27, 11, 19, 3, 30, 14, 22, 6 and 26 (Walsh codes corresponding to indices 0-12). Hence, the WALSH_MASK is applied to walsh codes determined by lwci0 and lwci1.

During the second prescribed time interval after the first prescribed time interval, a terminal is assigned to the PDCCH(0) transmission of the PDCH(0) includes a message format having a lwci0 field of 4 and another terminal is assigned to the PDCCH(1) transmission of the PDCH(1) includes a message format having a lwci1 field of 12. When the terminal assigned to PDCCH(0) obtains the lwci0 of 4, the masked Walsh codes are deleted as shown in FIG. 6A, and Walsh codes used for decoding PDCH(0) are 31 and 27. After the terminal assigned to PDCCH(1) obtains both the lwci0+1 and lwci1, the masked Walsh codes are deleted, as shown in FIG. 6A, and the Walsh codes used for decoding PDCH(1) are 11, 19, 3, 30, 14, 22, 6 and 26.

Based on the above description, the following applies when LWCI is used as a field for the PDCCH. The base station preferably sets this field to the last Walsh code index for the PDCH subpacket transmission concurrent with the transmission of this message on the PDCCH. If this message is being transmitted on the PDCCH(0) physical channel, the base station preferably sets this field to indicate that the Walsh code set includes the 0th through LWCIth entries in the WCI table. Otherwise, if this message is being transmitted on the PDCCH(1) physical channel, the base station preferably sets this field to indicate that the Walsh code set includes the (lwci0+1)th through LWCIth entries in the WCI table. If the MAC_ID in the PDCCH(0) message transmitted at the same time as this message is greater than or equal to '01000000', then lwci is the last Walsh code index in the PDCCH(0) message. If the MAC_ID in the PDCCH(0) message is less than '01000000', lwci0 is −1.

Second Preferred Embodiment of WCA Field

FIG. 6B is a diagram illustrating one of WCA interpretation method using 5-bit WCA in accordance with another embodiment of the present invention. Referring to FIG. 6B, which illustrates the Walsh codes corresponding to column "001" of FIG. 4, the Walsh codes disposed between a position corresponding to WCA(m−1) value and WCA(m) value are the ones used for the transmission of PDCH(m). As can be appreciated by one of ordinary skill in the art, there is no substantive difference between the first preferred embodiment and this second preferred embodiment other than the location of the code index within the WCI table. Hence, the code index number and location within the WCI table can be arbitrary decided. Further, N or M both refer to Walsh code users for transferring the PDCH, and are just arbitrary labels. Moreover, the label (i) for PDCH(i) or PDCCH(i), WCA(i) and WCL(i), where i=0 to a prescribed number, are also arbitrary, e.g., i can be 1 to a prescribed number.

When there are a plurality of physical channels, $N_{max\_PDCH}$ greater than 1, i of FIG. 1 has a range from 0, 1, . . . , to ($N_{max\_PDCH}$−1). The WCA(i) of PDCCH(i) is the information about those codes that are used for transferring PDCH(i). Usually, the number of bits x_i of the WCA field does not have to be a fixed number of bits, but can vary depending upon the whether this field indicates the number of Walsh codes based on the code index, and/or this field indicates a specific set of the codes belong to the Walsh code space of the WCI table. In this preferred embodiment, every message format of the PDCCH(i) has an identical configuration, i.e., the number of information control bits x_i is 5 for every PDCCH(i).

The WCA(0) on the PDCCH(0) indicates that the same number of Walsh codes with the WCA(0) value is used from the WCI table, starting from the code index indicative of higher priority Walsh codes. If i is greater than zero, the CWSI on the PDCCH(i) means a specific set of the codes taken from the Walsh code space of the Code priority table, following a specific rule. Specifically, the WCA(i) (i>0), of the PDCCH(i) indicates that the data is being transferred on the PDCH(i) using the Walsh codes from a relevant set based on the code index.

In addition, when i is greater than zero, the WCA(i) on the PDCCH(i) indicates that the WCA(i) value corresponds to the code index in the WCI table such that the number of Walsh codes indicated by the code index in the WCI table (except for the Walsh codes used by PDCH(0), PDCH(1), PDCH(2), . . . , and PDCH(i−1)) is used based on priority allocation for transferring PDCH(i). The base station performs scheduling to make the transmission power of PDCCH(i) equal to or stronger than that of PDCCH(i+1) based on the assumption that the terminal for transmission of PDCCH(i) is located in a better or similar communication environment than the terminal for transmission of PDCCH (i+1), i.e., power ranking. Further, when a terminal interprets a WCA(i) value of PDCCH(i), it preferably uses the WCA(j) information of other PDCCH(j) other than PDCCH(i), i.e., sequential decoding.

For example, suppose that the CDM/TDM system is used, and $N_{max\_PDCH}$ is 2, and broadcasting is not used. Hence, two of each PDCH(0), PDCCH(0), PDCH(1), and PDCCH (1) are used. If the WCA(0) field of the PDCCH(0) corresponds to the index code 4 of the WCI table, the same number (1-4) of Walsh codes, e.g., 31 (code index=1), 15 (code index=2), 23 (code index=3) and 7 (code index=4) in FIG. 6B, corresponding to the index code 4 are used for the transmission of PDCH(0).

Further, if the WCA(1) field of PDCCH(1) corresponds to the code index 10 of the WCI table, the WCA(1) value indicates that the corresponding number of Walsh codes, except for the Walsh codes used by the PDCH(0), are taken from the WCI table for the transmission of PDCH(1), starting from the higher priority code indexed Walsh codes to the lower priority code indexed Walsh codes, e.g., 27 (code index=5), 11 (code index 6), 19 (code index=7), 3 (code index=8), 29 (code index=9) and 13 (code index=10) of FIG. 6B.

As can be appreciated for all the embodiments, the composition of the WCI table allows many flexibilities. In this embodiment and the previous embodiment, the last code index has been used, but the code index can also be used as beginning Walsh Code index (BWCI). For example, if WCA(0)=4, PDCCH(0) will indicate Walsh codes 31, 15, 23 and if WCA(1)=10, PDCCH(1) will indicate Walsh codes 7, 27, 11, 19, 3, and 29. Based on the disclosure of the embodiments, the implementation will be apparent to one of ordinary skill in the art.

Third Preferred Embodiment of WCA Field

FIG. 7A illustrates another preferred embodiment of the present invention, where the code indices for WCA are used as start code numbers (SCN) and end code numbers (ECN). As shown in FIG. 7, which is one of the exemplary methods of using the SCN/ECN, the message format of FIG. 1 will include SCN and/or ECN (SCN/ECN) field for PDCCH(i) having either 0 or x_i number of bits rather than LWCI/CWSI field. The SCN/ECN indicates a specific set of Walsh codes in the WCI Table based on the code indices.

For example, if there are N number of users and Walsh codes corresponding to code indices 0 to 16 from the WCI table are available, where the other Walsh codes are used for other purposes, the SCN/ECN field for the 1st user (terminal or mobile station) of PDCCH(i) for transmission of PDCH (i), where i=0 to N-1 and i between different users are not the same, will include a SCN(0) of 0 and a ECN(0) of 3, the SCN/ECN field for the 2nd user of PDCCH(i) will include a SCN(1) of 4 (ENC(0)+1) and a ECN(1) of 9, . . . , and the SCN/ECN field for the Nth user of PDCCH(i) will include a SCN(N-1) of 13 (ECN(N-2)+1) and ECN(N-1) of 16 within a prescribed time interval for CDM scheduling.

In other words, the PDCH(i) for the 1st user is transmitted on Walsh codes 31, 15, 23, and 7, the PDCH(i) for the 2nd user is transmitted on Walsh codes 27, 11, 19, 3, 29 and 13, . . . , and the PDCH(i) for the Nth user is transmitted on Walsh codes 9, 30, 14 and 22. In terms of decoding, the 1st user searches for the corresponding MAC_ID field to obtain or collect the SCN and the ECN information bits, the 2nd user searches for the corresponding MAC_ID field to obtain or collect the SCN and the ECN information bits, . . . , and the Nth user searches for the corresponding MAC_ID field to obtain or collect the SCN and the ECN information bits in control message of the PDCCH(i).

In this embodiment, the priority, power ranking and/or sequential decoding may or may not be used due to the flexibility of this Walsh code allocation. For example, if none of the above is used, the SCN and ECN fields would comprise, for example, 10 bits, where 5 bits is would be representative of the SCN information bits and the other 5 bits would be representative of the ECN information bits. In such a case, the different users search for the corresponding MAC_ID field in corresponding PDCCH transmission of the PDCH, and use the Walsh codes corresponding to the SCN and the ECN in the WCI table.

If priority of the code indices is used, the PDCCH(0) will be allocated with the lowest code indices or the highest code indices, depending upon the order of priority. In such an instance, there is no need for the SCN(0) for the PDCCH(0) since this will be equal to 0 or the highest code index in the WCI table. Hence, the SCN/ECN field of PDCCH(0) may be, for example, 5 bits representative of the ECN information bits corresponding to a set of lower code indices within the WCI table whereas the SCN/ECN fields of the remaining PDCCH(i), where i=0 to N-1, will include both SCN(i) and ECN(i) information bits.

If both priority of the code indices and power ranking is use, the same as above applies to the PDCCH(0) physical channel. However, the SCN/ECN field of the last PDCCH (N-1) physical channel does not need to contain one of SCN(N-1) and ECN(N-1) information bits. For example, if the SCN/ECN field includes, for example, 5 information bits representative of SCN(N-1) of the code indices, the Nth user can readily utilize the Walsh codes corresponding to the set of code indices starting from SCN(N-1) to the last code index within the WCI table. Alternative, if the SCN/ECN field includes, for example, 5 information bits representative of ECN(N-1) of the code indices, the Nth user can readily utilize the Walsh codes corresponding to the set of code indices starting from the ECN(N-1) to the ECN(n-2)+1.

In another modification which uses priority, power ranking and sequential decoding, SCN/ECN field become the same as the LWCI field. In this instance, the SCN/ECN would preferable contain ECN information bits, which would be the same as LWCI field. Hence, the description above regarding the LWCI field is readily applicable to this preferred embodiment. Further, the discussion regarding masking is also readily applicable to this preferred embodiment whether or not priority or priority allocation, power ranking and/or sequential decoding is applied.

For TDM scheduling or mode, the PDCCH(0) is preferably used to provide ECN(0) of 5 bits, and the other physical channels PDCCH(1) to PDCCH(N-1) are suspending similar to the embodiment of LWCI.

This embodiment has various advantages. For example, in both CDM and TDM scheduling or mode, broadcasting is not required since the PDCCH is transmitted with the corresponding MAC_ID information. Further, Walsh code allocation (CDM) and available Walsh space indication (TDM) can be performed in a common manner. Also, the Walsh code allocation can be done in a fully flexible manner such that there is flexibility in system operation.

Fourth Preferred Embodiment of the WCA Field

FIG. 7B illustrates another embodiment of WCA interpretation in accordance with the present invention. This embodiment is similar to the embodiment of FIG. 7A. In other words, there is no substantive difference between the two embodiments other than the numbering of the code indices and what location or point in the WCI table the code indices corresponds to the Walsh codes. As can be appreciated, the index numbering and location on the WCI table to reference the Walsh codes can be arbitrary decided. For transmission of PDCH(m) for m>=0, the WCA(m) field of the PDCCH(m) will contain a value which would indicate that Walsh codes disposed between a starting position calculated by Equation 1 and an ending position calculated by Equation 2 are used.

$$\sum_{i=0}^{m-1} WCA(i) \qquad \text{[Equation 1]}$$

-continued $$\sum_{i=0}^{m} WCA(i) \quad \text{[Equation 2]}$$

For example, the Walsh codes used for transferring PDCH (m) corresponds to Walsh codes from the code index starting point 14[=WCA(0)+WCA(1)+ . . . +WCA(m−1)=14] and the code index ending point 19[=WCA(0)+WCA(1)+ . . . +WCA(m)]. In this preferred embodiment, the code index starting point of PDCH(0) is zero based on priority allocation. That is, the Walsh codes used for transferring PDCH(0) are the ones between the cod index starting point 0 and the code index ending point 4[=WCA(0)].

The WCA(m) can be interpreted by a terminal independently and once WCA(m) of PDCCH(m) including a terminal's MAC identifier is interpreted, any arbitrary terminal can get the information about the Walsh codes that are used by PDCH(m) where its packet data is being transferred.

The independent interpretation on WCA(m) by a terminal is largely divided into two cases. In the first case, all WCA(m) values have the same meaning. In the second case, one of the WCA value among all other WCA values has a different meaning.

In the first case, a plurality of control channels PDCCH (i) includes information regarding the Walsh codes that are positioned in the WCI table based on the first and the last code index. When PDCH(m) is transferred by using codes placed between a certain code index (Start_Walsh_Code; hereinafter referred to as SWC) in the WCI table and another specific code index (End_Walsh_Code; hereinafter referred to as EWC) in the Code priority table, the WCA(m) value comprises the value of the SWC and EWC.

For example, suppose that the WCA information bit on PDCCH(i) is 10 bits (x_i=10), then WCA(1)=(00100 010 10)$_2$, as illustrated in FIG. 7B. The starting point Walsh code is based on a SWC index whose position on the WCI table is $00100_2 = 4_{10}$, and the ending Walsh code is based on a EWC index whose position on the WCI table is $01010_2 = 10_{10}$. In this first case, every WCA(m) field of PDCCH(m) can use the same message format, e.g., x_i=10.

In the second case, at least one WCA(m) is based on a single code index number indicative of the number of Walsh codes used for the data transmission channel in accordance with the priority allocation, and the other WCA(m) include both the SWC index and the EWC index according to the priority allocation. In such a case, PDCCH(i), except for PDCCH(0), can use the same configuration with each other such that x_0=5, and x_i=10(i>0). In general, if i is larger than 0, x_i is twice x_0. In this example based on the illustration of FIG. 7B, the x_i equals 5 for WCA(0) and WCA(0)=(00100)=code index 4, which indicates that the number of Walsh codes equals the corresponding Walsh codes based on the code index 4 on the WCI table in accordance with priority allocation, i.e., Walsh codes 31, 15, 23 and 7.

However, for WCA(m), where m>0, the WCA(m) field includes both the SWC index and the EWC index in the WCI table. In this example based on the illustration of FIG. 7B, the number of bits of WCA(m)=x_i=10, where m>0 such that WCA(1)=(00100 01010), where SWC=4 and EWC= 10, . . . , WCA(m)=(01110 10011), where SWC=14 and EWC=19, . . . , and WCA(M−1)=(10111 11010), where SWC=23 and EWC=26.

Fifth Embodiment of the WCA Field

Walsh(i) is a set of Walsh codes the PDCH(i) uses at a particular time of transmission. It is composed of the components of the Walsh code space. Although the Walsh code space does not change, the Walsh codes included in the Walsh(i) changes based on time. In other words, a previous Walsh(i) and a current Walsh(i) have different components and the total number of their components. The Walsh code unit for the Walsh(i) is x, and the number of components of each Walsh(i) is a multiple of x., i.e., 1×, 2×, 3× and so forth. Here, the number of components of Walsh(i) is independent of the number of Walsh(all).

Figure 8:
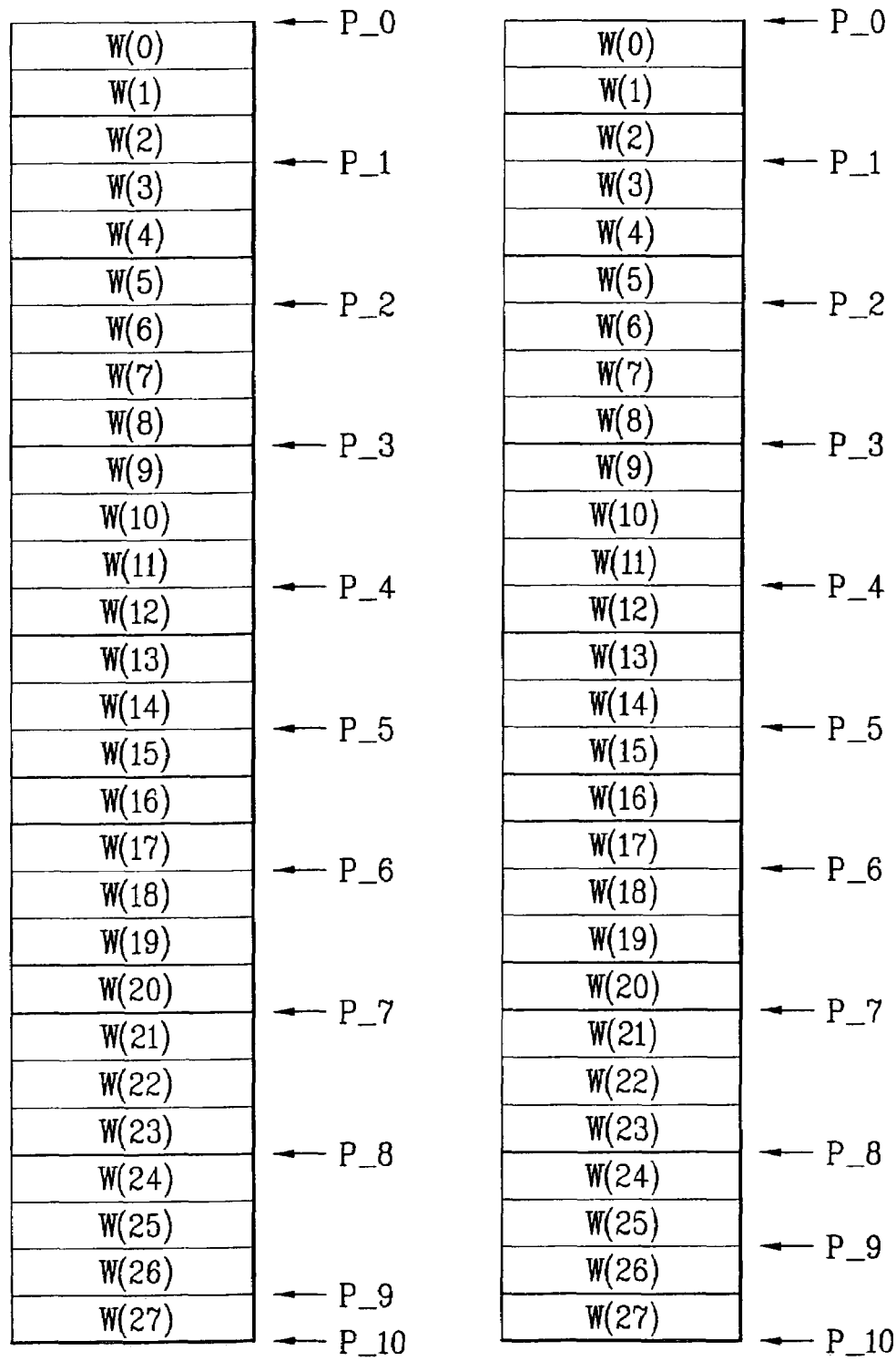
FIG. 8 illustrates another embodiment of the WCA field in accordance with a preferred embodiment of the present invention.

For example, if Walsh_max is 28, the Walsh code usage unit is 3, and the bit number of the WCA field is 6 based on WCA field indicates the number of Walsh codes (vs. WCA field containing the information about the set, in which case the number of bits of the WCA field can be as many as necessary.), the 11 points (e.g., P_0, P_1, . . . , P_10, as shown in FIG. 8) can be designated in the WCI table and a total of 55 sets can be created from this 11-point set although a total of '$2^6=64$' sets can be used based on the number of bits of the WCA field. Hence, there is is a one to one (1:1) correspondence of the 11-point set WCA value but the remaining WCA values, '64−55=9', may be used for different purposes Sixth Embodiment of WCA Field FIG. 9 illustrates another preferred embodiment, where the WCA is used as Walsh code index set values (WCISV), in which case the message format of FIG. 1 will include CISV field for PDCCH(i) having either 0 or x_i number of bits rather than LWCI/CWSI field. In this preferred embodiment, the code indices divided into sets based on the value indicated in the WCISV field of the PDCCH(i). The WCISV field is indicative of a general set of Walsh codes of the WCI table based on the code indices. Preferably, priority, power ranking and sequential decoding is used.

In the example shown in FIG. 9, the WCISV(0) field of PDCCH(0) would equal 4 for the 1st user, which would indicate that the Walsh codes corresponding to the 1st four code indices of the WCI table is preferably used to for transmission of the PDCH(0). Similarly, the WCISV(1) field would equal 6 for the 2nd user, which would indicate that the Walsh codes corresponding to code indices from WCISV (0)+1 to WCISV(0)+WCISV(1) is preferably used for transmission of the PDCH(1). The WCISV(n) field would equal 4 for the nth user, which would indicate that Walsh codes corresponding to code indices from WCISV(0)+WCISV (1)+ . . . +WCISV(n-1) to WCISV(0)+WCISV(1)+ . . . +WCISV(n-1)+WCISV(n) is preferably used for transmission of the PDCH(n). Due to sequential decoding, the user can collect the WCISV fields from PDCCH(0) to PDCCH (n). The number of information bits for this field is preferably be 5, but can be different depending upon the number of possible variations of the Walsh code allocation.

In TDM mode, the PDCCH(0) physical channel can be used to transmit the available Walsh codes with the WCISV (0) field. Again, no broadcasting is required and the various advantages described above can be readily applicable to this embodiment.

Seventh Embodiment of the WCA Field

When a terminal interprets WCA(i) with reference to other WCA(j) that are receives through a control channel, if a PDCCH(i) satisfies a specific condition, the WCA(i) bit number, $x\_i$, of the PDCCH(i) can be set to zero. In other words, given that the WCA is not broadcasted, and if the transmission power of a previously transmitted control channel among a plurality of control channels is the same or greater than the transmission power of a control channel that is to be transmitted, the number of bits of WCA of the control channel that is to be transmitted is 0. Hence, a terminal, which received WCA of 0 bits in the control channel implicitly interpreted such 0 bits of the WCA as indicative of using Walsh codes except the ones presently used for other control channels among the Walsh codes used for the plural control channels previously.

Figures 10, 11:
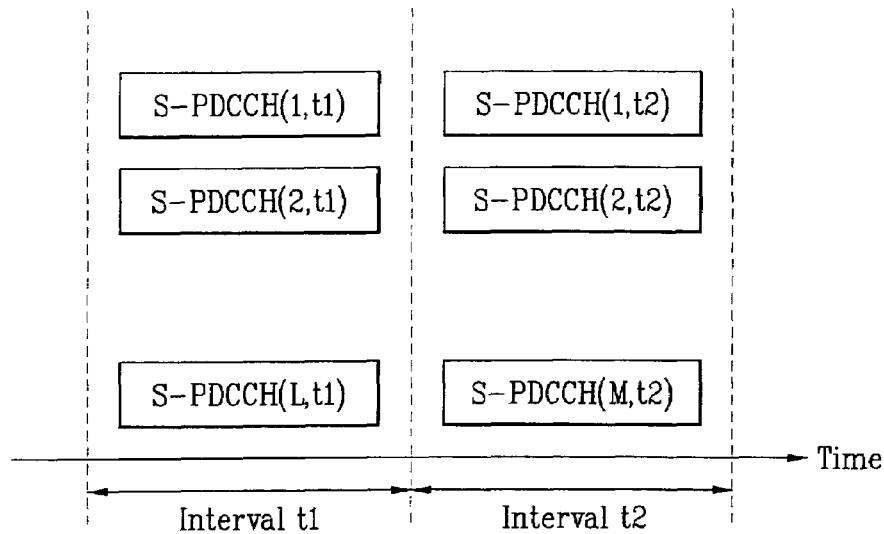
FIG. 10 illustrates another embodiment of the WCA field in accordance with a preferred embodiment of the present invention.
FIG. 11 illustrates another embodiment of the WCA field in accordance with a preferred embodiment of the present invention.

FIG. 10 illustrates control channels in terms of time when the number of bits of WCA(M, t2) is set to 0 bit in accordance with this preferred embodiment of the present invention. In this embodiment, it is that assumes PDCCH(i) transferred during a prescribed time interval t is PDCCH(i, t), and WCA on the PDCCH(i, t) is WCA(i, t), and the PDCH corresponding to the PDCCH(i, t) is PDCH(i, t). Further, the control channels that a base station transfers during a specific time interval t1 are PDCCH(1, t1), PDCCH(2, t1), ..., PDCCH(L, t1), and the control channels during the next time interval t2 are PDCCH(1, t2), PDCCH(2, t2), ..., PDCCH(M, t2), where L and M are arbitrary natural numbers.

If the following conditions are satisfied, the number of bits for WCA(M, t2) of PDCCH(M, t2) could be 0. The transmission power of PDCCH(L, t1) is equal or greater than the transmission power of PDCCH(1, t2). In a such case, the Walsh codes for transferring PDCH(M, t2) are the remaining codes except for the Walsh codes that are used for transferring PDCCH(1, t2), PDCCH(2, t2), ..., and PDCCH(M−1, t2)} among the Walsh codes used for transferring PDCCH(1, t1), PDCCH(2, t1), ..., and PDCCH(L, t1).

Eighth Embodiment of the WCA Field

In the above-described embodiments, there is a possibility there are more than one PDCCH(i) having the same MAC identifier among a the plurality of PDCCHs being simultaneously transferred. In other words, among {PDCCH(0), PDCCH(1), ..., PDCCH($N_{real\_PDCH}$−1)}, the MAC identifier for PDCCH(i) and for PDCCH(j)(i≠j) could be identical with each other.

In this instance, the terminal may collectively regard part or all of the PDCHs corresponding to the PDCCHs having the same MAC identifier as one PDCH, and the terminal may undertake the reception procedure thereof (e.g., performing decoding, or error correction code check) and performs signal processing thereon. The terminal determines, with reference to the other information bits besides the MAC_ID, whether it should collectively regard certain PDCHs among the plurality of PDCHs corresponding to PDCCHs with the same MAC identifier as one PDCH/PDCCH.

If the MAC_ID of two PDCCH are the same (two is intended to be exemplary), but EP_SIZE, ACID, AI_SN, and SPID are different, the terminal regards the two PDCHs and two corresponding PDCCHs as different, and the terminal undertakes the reception procedure for each PDCH separately. However, if the MAC_ID, EP_SIZE, ACID, AI_SN, and SPID are the same, the terminal collectively regards the two PDCHs and PDCCHs as one PDCH and PDCCH, and the terminal initiates the reception procedure for one PDCH/PDCCH. Further, the Walsh codes that are used for transferring PDCH at this time are the ones that are used by the relevant PDCHs for relevant PDCCHs.

For example, if PDCCH(2) and PDCCH(5) have the same MAC_ID, EP_SIZE, ACID, AI_SN, and SPID, the PDCH (2) and the PDCH(5) being transferred are actually as one PDCH. Hence, if the WCA(2) and WCA(5) fields of PDCCH(2) and PDCCH(5) indicates Walsh codes 31, 15, 23 and Walsh codes 22, 6, 26, 10, and 18, respectively, based on a code index indicative of a number of Walsh codes in the WCI table, or based on a general set of Walsh codes corresponding to code index or based on a specific set of Walsh codes corresponding to the code index, the terminal can readily determine that Walsh codes 31, 15, 23, 22, 6, 26, 10, 18 is to be used for decoding.

Ninth Embodiment of the WCA Field

In addition to the above embodiments illustrating the use of the additional field which is broadly labeled as the WCA field, a Code Division Multiple Indicator field (hereinafter referred to as CDMI) may be further added to the information bits of PDCCH(i) in order to increase the overall system efficiency, as illustrated in FIG. 11( ). The CDMI allows the terminals to know the number of control channels that are currently being transferred through the CDM system. FIG. 11 also illustrates the number of information bits in the message format of PDCCH(i) (excluding EXT_MSG_TYPE and RESERVED). The CDMI is used to inform the terminal as to whether there are additional PDCCH to be received, and if so, the terminal can estimate the number of control channels that are being transferred through the CDM system.

According to a predetermined rule between the terminal and the base station, the CDMI(i) will indicate to the terminal that it is suppose to receive another PDCCH(k). For example, if CDMI(i)=$(0)_2$, this will indicate to the terminal that it will not receive PDCCH(k) since there is no PDCCH (k), and if CDMI(i)=$(1)_2$, this will indicate to the terminal that it should attempt to receive PDCCH(k), if necessary, since there is a PDCCH(k). As can be appreciated, the value of 0 or 1 or vice versa can be use to indicate whether there is another control channel, and further, other values of CDMI may be used. To implement this embodiment, the terminal preferably includes an additional device for detecting different bit number of the CDMI. One example of the additional devices is generating error detection bits in accordance with the bit number of $y\_i$ when PDCCH is generated.

Tenth Embodiment of the WCA Field

For the purpose of improving the applicability of Walsh codes, the Walsh codes that are reserved for the transmission of PDCCH(i) (i.e., codes in the Walsh Code Space) can be used for the transmission of PDCHs if a corresponding PDCCH(i) is not currently using the Walsh codes. In such case, the base station preferably informs the terminals which PDCHs are using the Walsh codes in the WCI table. In such a case, the CDMI of the previous embodiment can be used for such a task.

The base station allows the terminals to know which Walsh codes in the WCI table are being used for which PDCH based on the code indices. The terminals, discovering in which PDCCH(i) a specific value of CDMI is found, concludes which Walsh codes in WCI table are used for which PDCH. In complying to the predetermined rule(s) between the base station and the terminals, a terminal is supposed to receive PDCCH(i) and thereafter PDCCH(k). If the value of the CDMI(i) equals 0, there is no PDCCH(k).

For example, let assume that $N_{max\_PDCH}$ is 4, and WCL=wcl(0), wcl(1), wcl(2), and wcl(3). When CDMI(i) value on a certain PDCCH(i) is 0, the Walsh codes for use of the transmission of PDCH(i) corresponding to PDCCH(i) includes the Walsh codes that are allocated for transferring PDCH(i) in the WCI table, and the Walsh codes that are not yet used by PDCCH(0), PDCCH(1), . . . , PDCCH(i) in the WCI table. For instance, suppose that PDCCH(1) indicates a PDCCH whose CDMI value is 0. Then, among wcl(2) and wcl(3), the codes, which satisfy the predetermined requirements between the terminal and the base station, are used additionally for transferring PDCH(1).

Eleventh Embodiment of the WCA Field

As previously described in some of the embodiment, the WCA can be used for the TDM system or TDM scheduling. However, all the previous embodiments are readily applicable to TDM system or TDM scheduling. In TDM system, $N_{max\_PDCH}$ is equal to 1, and hence, TDM system uses only one PDCH(i) and one PDCCH(i), and the other PDCHs and PDCCHs are suspended. In such an instance, the WCA can be used as WSI, but without the need to broadcast regularly or intermittently. Further, the WCA serving as the WSI can allocate the resources such that not all available Walsh codes are used for transmission of the PDCH(i) and PDCCH(i).

In this instance, the 5-bit WCA, 2-bit ACID, and the 3-bit EP_SIZE are preferably used. Further, the value of the WCA represents the code index on the WCI table, and represent the number of codes from the highest priority code indexed Walsh code to the lower priority code index Walsh code of the WCI table, e.g., LWCI. For example, if the value of WCA is '$00011_2(3_{10})$', 3 Walsh codes from code index 0 to code index 3 of FIG. 5 are used for transmission of the PDCH and thereafter, the WCA can be used to decode the data on the PDCH by the terminal. Further, since the PDCCH(i) includes the MAC_ID, broadcasting is not needed and such that the WCA need not be transferred to all terminals, but only to a particular relevant terminal requiring the WCA.

Twelfth Embodiment of the WCA Field

In the above 11 embodiments, WCA was not broadcasted to all the terminals, but was transferred only to specific terminals. However, the unique feature of the WCA allows flexibility such that WCA may be used via broadcasting using a prescribed control channel. This control channel may be one of the existing control channels or a new broadcasting channel labeled as Walsh Code Allocation Channel.

For example, when $N_{max\_PDCH}$ is 2, two PDCH(i) and two PDCCH(i) are used, wherein i=0 and 1. Assuming that the PDCCH(0) is used for broadcasting, the information bits on the PDCCH(0) are set up in a particular way, e.g., MAC_ID equals '00000000', and SPID is set up as '11' and the 2-bit ACID is added with the x_0 bits, e.g., 5 bits, of the WCA. This can be broadcasted to all the terminals to notify the available Walsh codes. The 5 bit WCA can indicate the number of Walsh codes in the WCI table, e.g., LWCI, a general set of Walsh codes in the WCI table or a specific set of Walsh codes in the WCI table. Alternatively, the PDCCH (1) physical channel can be used for such broadcasting.

Transmission Chain for Packet Data Channel Structure

The Packet Data Channel preferably transmits a prescribed number of information bits, e.g., 386, 770, 1538, 2306, 3074, or 3842 bits. Sixteen packet frame quality indicator bits and six turbo encoder tail allowance bits are added to the information bits to form encoder packets. The encoder packets are encoded with a rate-1/5 turbo encoder, interleaved, and scrambled. Thereafter, symbols from the scrambled sequence are selected for transmission as a subpacket. The selected symbols may not include all of the scrambled output symbols or they may include all of the scrambled output symbols with some symbols repeated one or more times. The selected subpacket symbols are modulated into QPSK, 8-PSK, or 16-QAM symbols and demultiplexed into one to 28 32-chip Walsh channels used for that Forward Packet Data Channel. Each of these Walsh channels is spread with a different 32-chip Walsh function. Then, the spread symbols on the Walsh channels are summed to obtain a single sequence of I/Q-symbols.

Figure 12A:
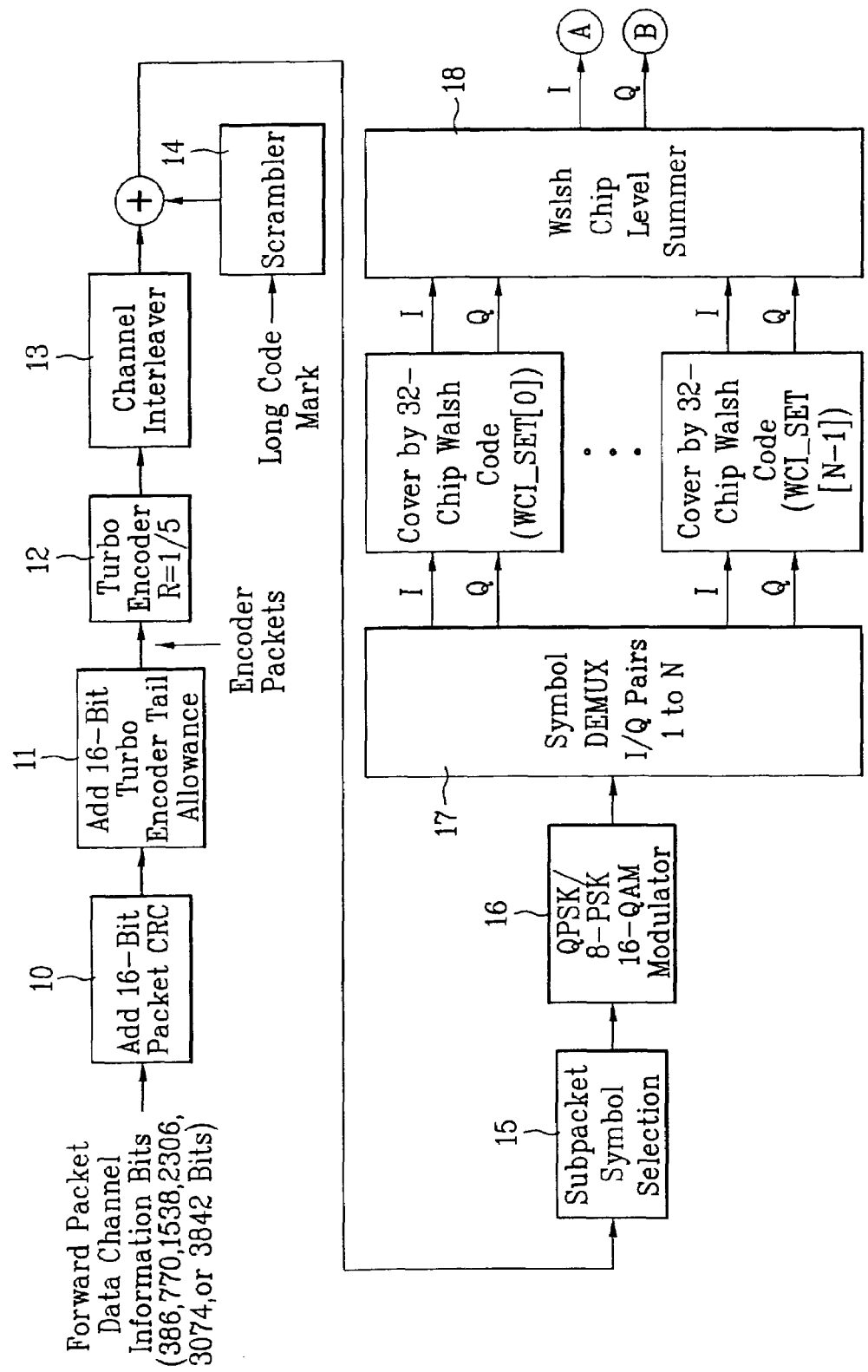
FIGS. 12A and 12B illustrate a PDCH transmission chain structure in accordance with a preferred embodiment of the present invention.
Figure 12B:
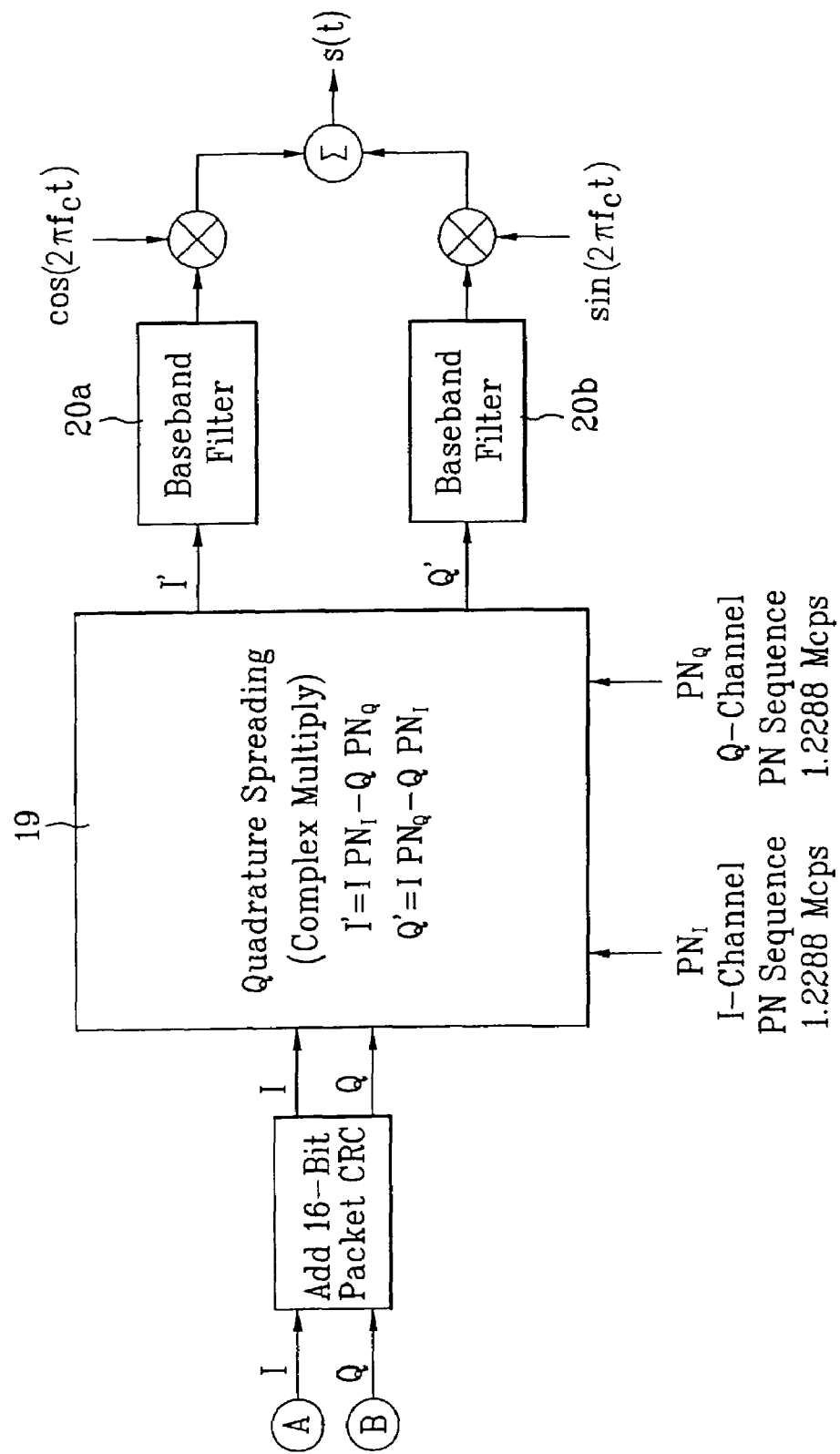

FIGS. 12A and 12B illustrate such a transmission chain for the PDCH. The prescribed number of information bits of the PDCH is inputted to a CRC generator 10 to add 16 frame quality indicator bits and thereafter to a tail allowance generator 11 to add 6 turbo encoder tail allowance bits. A Cyclic Redundancy Code (CRC) is a class of linear error detecting codes, which generate parity check bits by finding the remainder of a polynomial division. The encoder tail bits a fixed sequence of bits added to the end of a block of data to reset the turbo encoder to a known state.

A turbo encoder 12 discards the turbo encoder tail allowance bits and adds turbo encoder output tail bits such that the number of bits out of the rate-1/5 turbo encoder is five times the number of bits in an encoder packet. The encoder packets are turbo encoded with a code rate of 1/5.

During encoding, an encoder output tail sequence is added, and the turbo encoder generates Nturbo/R encoded data output symbols followed by 6/R tail output symbols, where R is the code rate of 1/2, 1/3, 1/4, or 1/5, where Nturbo is the total number of information bits and frame quality indicator bits. The turbo encoder 12 employs two systematic, recursive, convolutional encoders connected in parallel, with an interleaver, the turbo interleaver, preceding the second recursive convolutional encoder. The two recursive convolutional codes are called the constituent codes of the turbo code. The outputs of the constituent encoders are punctured and repeated to achieve the (Nturbo+6)/R output symbols.

The turbo encoder output sequence is interleaved by a channel interleaver 13. The interleaving comprises symbol separation, subblock interleaving, and symbol grouping of the turbo encoder output sequence. Every interleaver output symbol are exclusive-OR'd with the corresponding bit of the scrambling sequence generated by a scrambler 13 based on a public long code mask or a private long code mask to yield a scrambled output bit.

Subpacket symbols are selected from the scrambler output sequence by a selector 15. Encoder packets are transmitted as one or more subpackets. Initially, the first subpacket is transmitted. Then, subsequent subpackets are transmitted if requested by the mobile station. The symbols in a subpacket are formed by selecting specific sequences of symbols from the interleaved and scrambled turbo encoder output sequence. The resulting subpacket sequence is a binary sequence of symbols for a modulator 16.

The symbols from the subpacket symbol selection process are modulated. The modulator 16 maps the symbols from the subpacket symbol selection process into a sequence of QPSK, 8-PSK, or 16-QAM modulation symbols. The type of modulation depends on the encoder packet size, number of Walsh channels, and number of slots.

The modulated symbols are demultiplexed into Walsh channels, each Walsh channel is Walsh spread, and the spread symbols from the Walsh channels are summed. A demultiplexer 17 demultiplexes the in-phase stream at the output of QPSK/8-PSK/16-QAM modulator into N parallel streams, I1,I2, . . . , IN, where N is the total number of 32-chip Walsh codes that are indicated in WCI_SET (i.e., WCI table). Similarly, the quadrature stream at the output of the QPSK/8-PSK/16-QAM modulator are demultiplexed into N parallel streams, Q1, Q2, . . . , QN. For each k=1, 2, . . . , N, the demultiplexed streams with labels Ik and Qk are assigned to the in-phase and quadrature phases, respectively, of the kth Walsh code that appears in the WCI_SET. Following the Walsh channel spreading, the spread subpacket modulation symbols from the Walsh channels are summed by a summer 18 to form a single sequence of (I, Q) symbols.

After performing a orthogonal spreading and channel gain, each code channel is spread in quadrature by a spreader. The spreading sequence is preferably a quadrature sequence of a prescribed length, e.g., $2^{15}$ (i.e., 32768 PN chips in length). This sequence is called the pilot PN sequence. Following the spreading operation, the I and Q impulses are applied to the inputs of the I and Q baseband filters 20a and 20b. Thereafter, the outputs of the filters 20a and 20b are mixed, summed and transmitted over the PDCH.

On the terminal side, the decoding is substantially the reverse of this encoding process.

Transmission Chain for Packet Data Control Channel Structure

Figure 13:
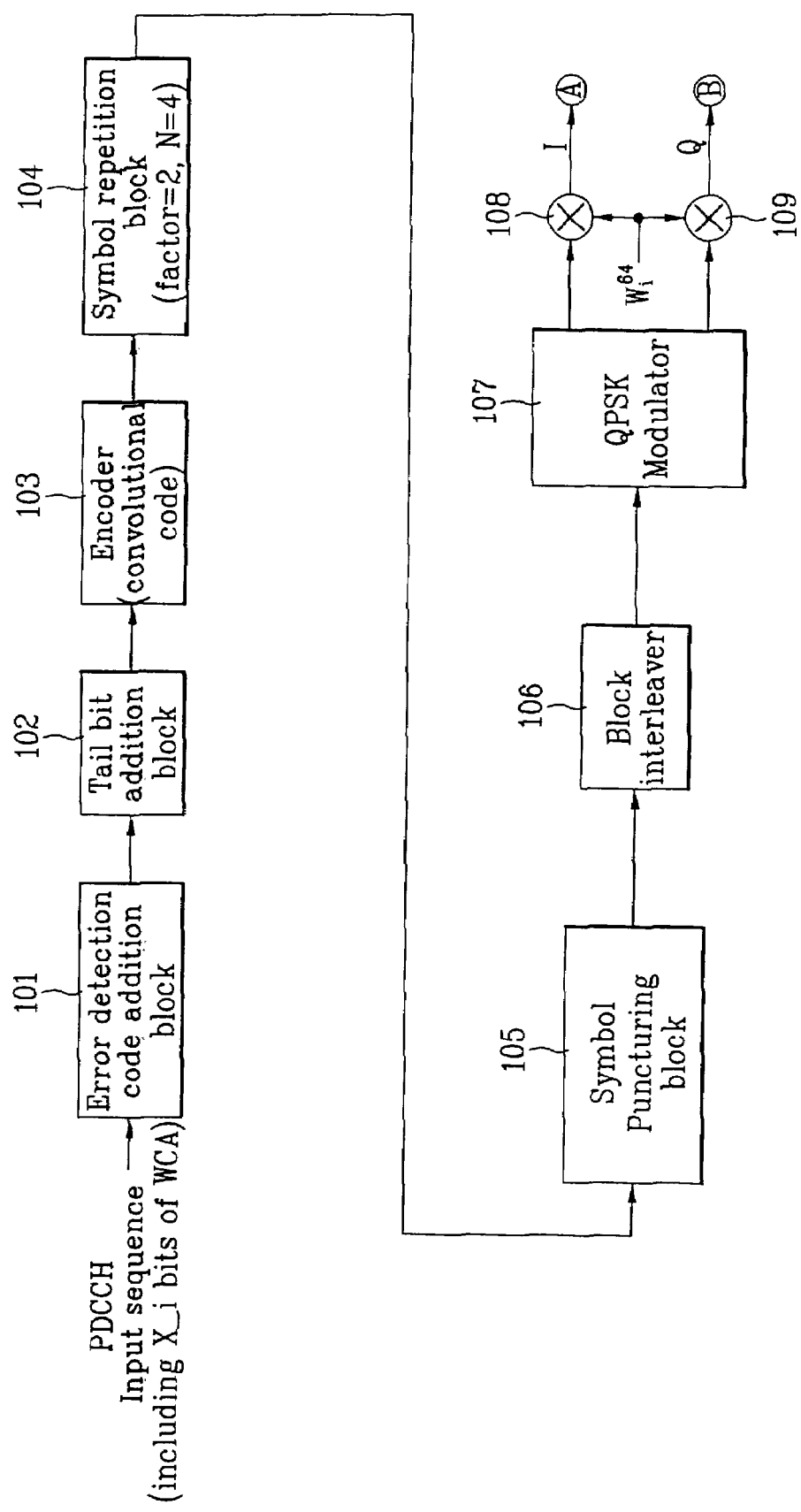
FIG. 13 illustrates a general PDCCH transmission chain structure in accordance with a preferred embodiment of the present invention.

FIG. 13 illustrates a general configuration of PDCCH transmission chain in accordance with one preferred embodiment of the present invention. The input sequence of PDCCH includes 2-bit ARQ channel identifier, 3-bit encoder packet size, 1-bit AI_SN, x_i-bit WCI, and 2-bit subpacket identifier with or without the 8-bit MAC, An error detection code like CRC (cyclic redundancy check) code in an error detection code adding block 101 to the input sequence. This added bit is provided with tail bits for sending a final state of the encoder from a tail bit adding blocks 102 trellis termination. The bits with tail bit are encoded to convolutional code at the encoder 103.

The encoded bits are repeated to a prescribed repetition factor at the symbol repetitive block 104. Such repeated bits goes through puncturing process at the symbol puncturing block 105. Those puncturing processed bits are interleaved at the block interleaver 106, and are modulated at the modulator 107, in conforming to QPSK method. The modulated signals are divided into I channels and Q channels, by using part of the Walsh codes indicated by WCL.

For a given base station, the I and Q pilot PN sequences for the Forward Packet Data Control Channel preferably use the same pilot PN sequence offset as for the Forward Pilot Channel. The modulation symbols transmitted on the first Forward Packet Data Control Channel (PDCCH_ID='0') should preferably be transmitted using at least as much energy as the modulation symbols transmitted on the second Forward Packet Data Control Channel (PDCCH_ID='1') that is being transmitted simultaneously, $N_{max\_PDCH\ is}$ 2.

The tail bit generator generates the last eight bits of each Forward Packet Data Control Channel frame are called the Encoder Tail Bits. Preferably, each of the eight bits is set to '0'. The encoder convolutionally encodes as the PDCCH frame. Preferably, the encoder is initialized to the all-zero state at the end of each frame. The encoded PDCCH frame undergoes code symbol repetition and the code symbols resulting from the symbol repetition are punctured. The modulation symbols on the PDCCH are then interleaved, and the interleaver block is align with the PDCCH frame. The modulation signal is provided to the signal point mapping block (e.g., modulator) for transmission The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for receiving packet data in a mobile communication system supporting at least one data channel and at least one data control channel, comprising:

receiving a first control information having a first code allocation information on a first data control channel;

receiving a second control information having a second code allocation information on a second data control channel;

receiving first packet data on a first data channel by using a first portion of a code space, the first portion indicated by the first code allocation information; and receiving second packet data on a second data channel by using a second portion of the code space, the second portion indicated by the first code allocation information and the second code allocation information.

2. The method of claim 1, wherein the first allocation information indicates a last code allocated to a first data channel on a code list.

3. The method of claim 2, wherein the second code allocation information indicates a last code allocated to the second data channel on the code list.

4. The method of claim 2, wherein the control channel and the second data control channel are forward data control channels transmitted from a base station.

5. The method of claim 4, wherein a transmission power or energy of the first data control channel is at least as much as a transmission power or energy of the second data control channel.

6. The method of claim 1, wherein, when the first code allocation information is lwci0, the first portion of the code space includes codes from index 0 to lwci1.

7. The method of claim 6, wherein, when the first code allocation information is lwci0 and the second allocation information is lwci1, the second portion of the code space includes codes from index lwci0+1 to lwci1.

8. The method of claim 1, wherein the first data control channel and the second data control channel are determined based on a transmission power.

9. A method for transmitting packet data in a mobile communication system supporting at least one data channel and at least one data control channel, comprising:

transmitting a first control information having a first code allocation information on a first data control channel;

transmitting a second control information having a second code allocation information on a second data control channel;

transmitting first packet data on a first data channel by using a first portion of a code space, the first portion indicated by the first code allocation information; and transmitting second packet data on a second data channel by using a second portion of the code space, by using a second portion of the code space the first code allocation information and the second code allocation information.

10. The method of claim 9, wherein a transmission power or energy of the first data control channel is at least as much as a transmission power or energy of the second data control channel.

11. The method of claim 9, wherein the first code allocation information indicates a last code allocated to the first data channel on a code list.

12. The method of claim 9, wherein the second code allocation information indicates a last allocation code allocated to the second data channel on a code list.

13. The method of claim 9, wherein the first packet data and the second packet data are transmitted by code division multiplexing.

14. The method of claim 9, wherein the first packet data and the second packet data are transmitted to two mobile terminals with same time interval.

15. The method of claim 9, wherein the first and second code allocation information indicates a number of Walsh codes on a code list in which codes are ordered according to their priority.

16. The method of claim 9, wherein the first data control channel and the second data channel is transmitted simultaneously.

17. The method of claim 16, wherein the second data control channel and the second data channel is transmitted simultaneously.

18. The method of claim 9, wherein, when the first code allocation information is lwci0, the first portion of the code space includes codes from index 0 to lwci1.

19. The method of claim 18, wherein, when the first code allocation information is lwci0 and the second allocation information is lwci1, the second portion of the code space includes codes from index lwci0+1 to lwci1.

* * * * *